United States Patent
Malamal Vadakital et al.

(10) Patent No.: US 10,631,069 B2
(45) Date of Patent: Apr. 21, 2020

(54) MEDIA ENCAPSULATING AND DECAPSULATING

(71) Applicant: Nokia Technologies Oy, Espoo (FI)

(72) Inventors: Vinod Kumar Malamal Vadakital, Tampere (FI); Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 31 days.

(21) Appl. No.: 16/077,576

(22) PCT Filed: Feb. 16, 2016

(86) PCT No.: PCT/FI2016/050096
§ 371 (c)(1),
(2) Date: Aug. 13, 2018

(87) PCT Pub. No.: WO2017/140939
PCT Pub. Date: Aug. 24, 2017

(65) Prior Publication Data
US 2019/0052937 A1    Feb. 14, 2019

(51) Int. Cl.
*H04N 21/845* (2011.01)
*H04N 21/234* (2011.01)
(Continued)

(52) U.S. Cl.
CPC ....... *H04N 21/8455* (2013.01); *H04L 65/602* (2013.01); *H04L 65/604* (2013.01);
(Continued)

(58) Field of Classification Search
CPC ............. H04N 21/8455; H04N 21/234; H04N 21/85406; H04N 21/435; H04N 21/4343;
(Continued)

(56) References Cited

U.S. PATENT DOCUMENTS 8,856,218 B1    10/2014    Inskip
2009/0119594 A1    5/2009    Hannuksela
(Continued)

FOREIGN PATENT DOCUMENTS

WO    2009/057047 A2    5/2009
WO    2011/038013 A2    3/2011
(Continued)

OTHER PUBLICATIONS

Extended European Search Report received for corresponding European Patent Application No. 16890418.3, dated Sep. 20, 2019, 10 pages.

(Continued)

*Primary Examiner* — Hai V Tran
(74) *Attorney, Agent, or Firm* — Nokia Technologies Oy

(57) ABSTRACT

There are disclosed various methods, apparatuses and computer program products for media encapsulating and decapsulating. In an example method for encapsulating media data, a container file including at least one meta data unit in a media data structure is formed. It may be determined that an offset is relative to a location of the media data structure in the container file, wherein the offset data is formed as a reference to the location of the media data structure in the media data unit. An indication that the offset data is relative to the location of the media data structure is included. In an example method for decapsulating media data, a container file including at least one meta data unit in a media data structure and offset data are received. It may be determined that the offset data is relative to a location of the media data structure in the container file, wherein the offset data is used as a reference to the location of the media data structure to obtain the media data unit.

11 Claims, 8 Drawing Sheets

(51) Int. Cl.
  *H04L 29/06* (2006.01)
  *H04N 21/435* (2011.01)
  *H04N 21/854* (2011.01)
(52) U.S. Cl.
  CPC ......... *H04L 65/607* (2013.01); *H04N 21/234* (2013.01); *H04N 21/435* (2013.01); *H04N 21/85406* (2013.01)
(58) Field of Classification Search
  CPC ............ H04N 21/23605; H04L 65/607; H04L 65/604; H04L 65/602
  See application file for complete search history.

(56) References Cited

U.S. PATENT DOCUMENTS

| | | | | |
|---|---|---|---|---|
| 2011/0096828 | A1* | 4/2011 | Chen ................ | H04N 21/23106 375/240.02 |
| 2012/0023253 | A1* | 1/2012 | Rhyu ............... | H04N 21/23439 709/231 |
| 2013/0091251 | A1 | 4/2013 | Walker et al. | |
| 2013/0132507 | A1 | 5/2013 | Swaminathan et al. | |
| 2014/0156663 | A1* | 6/2014 | Rhyu ................... | G11B 27/031 707/737 |
| 2014/0317668 | A1* | 10/2014 | Zhang .................. | H04N 21/442 725/116 |
| 2015/0193494 | A1 | 7/2015 | Malamal Vadakital et al. | |
| 2016/0182927 | A1* | 6/2016 | Denoual ........ | H04N 21/234345 725/109 |

FOREIGN PATENT DOCUMENTS

| | | |
|---|---|---|
| WO | 2011/159602 A1 | 12/2011 |
| WO | 2012/032502 A1 | 3/2012 |

OTHER PUBLICATIONS

Hannuksela et al., "An Editorial Update of the Image File Format Specification (ISO/IEC 23008-12)", ISO/IEC JTC1/SC29/WG 11 Coding of Moving Pictures and Audio, ISO/IEC JTC1/SC29/WG 11 MPEG2015/M35711 v2, Nokia Technologies, Feb. 2015, 7 pages.

Vadakital et al., "HEVC FF / ISOBMFF: Signaling of Samples That are Decoded but not Displayed", ISO/IEC JTC1/SC29/WG11 Coding of Moving Pictures and Audio, ISO/IEC JTC1/SC29/WG11 MPEG2013/M28853, Nokia Corporation, Apr. 2013, 3 pages.

"Information Technology—Coding of Audio-visual Objects-Part 12: ISO Base Media File Format", ISO/IEC 14496-12, 4th edition, 2012, 190 pages.

"3rd Generation Partnership Project; Technical Specification Group Services and System Aspects; Transparent end-to-end packet switched streaming service (PSS); 3GPP file format (3GP) (Release 12)", 3GPP TS 26.244 V12.2.0, Dec. 2013, pp. 1-61.

Office action received for corresponding Vietnam Patent Application No. 1-2018-04074, dated Oct. 5, 2018, 1 page of office action and 1 page of translation available.

"Information technology—Coding of Audio-Visual Objects—Part 12: ISO Base Media File Format", IOS/IEC 14496-12, Fifth Edition, Dec. 15, 2015, 248 pages.

Concolato et al., "Clarification on Fragment Identifiers for ISOBMFF", Telecom ParisTech, ISO/IEC JTC1/SC29/WG11 MPEG2014/ M35090, Oct. 2014, 2 pages.

Fielding et al., "Hypertext Transfer Protocol (HTTP/1.1): Message Syntax and Routing", RFC 7230, Internet Engineering Task Force (IETF), Jun. 2014, pp. 1-90.

Swaminathan et al., "Low Latency Live Video Streaming Using HTTP Chunked Encoding", IEEE 13th International Workshop on Multimedia Signal Processing, Oct. 17-19, 2011, 6 pages.

"Information technology—Coding of Audio-Visual Objects—Part 14: MP4 File Format", ISO/IEC 14496-14, First Edition, Nov. 15, 2003, 18 pages.

"Information Technology—Coding of Audio-Visual Objects—Part 15: Advanced Video Coding (AVC) File Format", ISO/IEC 14496-15, First Edition, Apr. 15, 2004, 29 pages.

"Information technology—MPEG systems technologies—Part 12: Image File Format", ISO/IEC CD 23008-12, First Edition, Apr. 30, 2013, 55 pages.

"3rd Generation Partnership Project; Technical Specification Group Services and System Aspects; Transparent end-to-end packet switched streaming service (PSS); 3GPP file format (3GP) (Release 13)", 3GPP TS 26.244, V13.3.0, Dec. 2015, pp. 1-66.

"Information Technology—Dynamic Adaptive Streaming Over HTTP (DASH)—Part 1: Media Presentation Description and Segment Formats", ISO/IEC 23009-1, Second Edition, May 15, 2014, 152 pages.

International Search Report and Written Opinion received for corresponding Patent Cooperation Treaty Application No. PCT/FI2016/050096, dated Jun. 10, 2016, 16 pages.

Office action received for corresponding Korean Patent Application No. 2018-7026684, dated Nov. 18, 2019, 5 page of office action and no pages of translation available.

\* cited by examiner

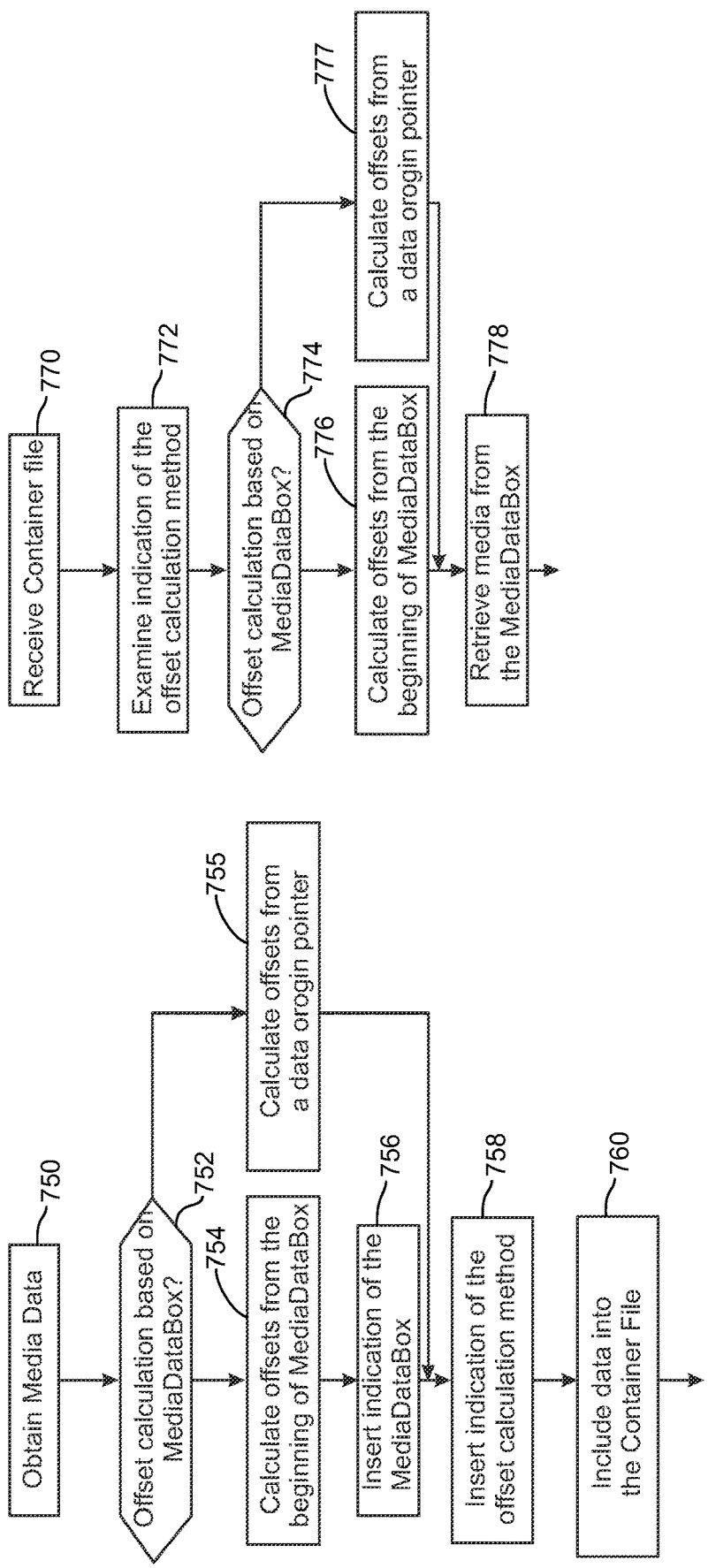

MEDIA ENCAPSULATING AND DECAPSULATING

RELATED APPLICATION

This application was originally filed as Patent Cooperation Treaty Application No. PCT/FI2016/050096, filed Feb. 16, 2016.

TECHNOLOGICAL FIELD

The present invention relates generally to the use of media file formats. More particularly, the present invention relates to a method for encapsulating media data signal into a file and a method for decapsulating media data from a file. The present invention also relates to apparatuses and computer program products for encapsulating media data into a file and apparatuses and computer program products for decapsulating media data from a file.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A media container file format is an element in the chain of media content production, manipulation, transmission and consumption. In this context, the coding format (i.e., the elementary stream format) relates to the action of a specific coding algorithm that codes the content information into a bitstream. The container file format comprises mechanisms for organizing the generated bitstream in such a way that it can be accessed for local decoding and playback, transferring as a file, or streaming, all utilizing a variety of storage and transport architectures. The container file format can also facilitate the interchanging and editing of the media, as well as the recording of received real-time streams to a file. As such, there may be substantial differences between the coding format and the container file format.

BRIEF SUMMARY

Various embodiments provide systems and methods for media encapsulating and decapsulating.

Various aspects of examples of the invention are provided in the detailed description.

According to a first aspect there is provided a method comprising:
  receiving a container file including at least one meta data unit in a media data structure;
  receiving offset data;
  determining that the offset data is relative to a location of the media data structure in the container file; and
  using the offset data as a reference to the location of the media data structure to obtain the media data unit.

According to a second aspect there is provided an apparatus comprising at least one processor and at least one memory, said at least one memory stored with code thereon, which when executed by said at least one processor, causes an apparatus to perform at least the following:
  receive a container file including at least one meta data unit in a media data structure;
  receive offset data;
  determine that the offset data is relative to a location of the media data structure in the container file; and
  use the offset data as a reference to the location of the media data structure to obtain the media data unit.

According to a third aspect there is provided a computer program product embodied on a non-transitory computer readable medium, comprising computer program code configured to, when executed on at least one processor, cause an apparatus or a system to:
  receive a container file including at least one meta data unit in a media data structure;
  receive offset data;
  determine that the offset data is relative to a location of the media data structure in the container file; and
  use the offset data as a reference to the location of the media data structure to obtain the media data unit.

According to a fourth aspect there is provided a method comprising:
  forming a container file including at least one meta data unit in a media data structure;
  forming offset data into the container file as a reference to the location of the media data unit relative to the media data structure; and
  including an indication that the offset data is relative to the location of the media data structure.

According to a fifth aspect there is provided an apparatus comprising at least one processor and at least one memory, said at least one memory stored with code thereon, which when executed by said at least one processor, causes an apparatus to perform at least the following:
  form a container file including at least one meta data unit in a media data structure;
  form offset data into the container file as a reference to the location of the media data unit relative to the media data structure; and
  include an indication that the offset data is relative to the location of the media data structure.

According to a sixth aspect there is provided a computer program product embodied on a non-transitory computer readable medium, comprising computer program code configured to, when executed on at least one processor, cause an apparatus or a system to:
  form a container file including at least one meta data unit in a media data structure;
  form offset data into the container file as a reference to the location of the media data unit relative to the media data structure; and
  include an indication that the offset data is relative to the location of the media data structure.

According to a seventh aspect there is provided an apparatus configured to perform the method of the first aspect.

According to an eighth aspect there is provided an apparatus configured to perform the method of the fourth aspect.

According to a ninth aspect there is provided an apparatus comprising.
  means for receiving a container file including at least one meta data unit in a media data structure;
  means for receiving offset data;
  means for determining that the offset data is relative to a location of the media data structure in the container file; and
  means for using the offset data as a reference to the location of the media data structure to obtain the media data unit.

According to a tenth aspect there is provided an apparatus comprising:
    means for forming a container file including at least one meta data unit in a media data structure;
    means for forming offset data into the container file as a reference to the location of the media data unit relative to the media data structure; and
    means for including an indication that the offset data is relative to the location of the media data structure.

According to an eleventh example, there is provided a method comprising:
    requesting a part of a file with a first request, the first request comprising an identification of a data structure, the identification comprising a type and an identifier, wherein the identifier identifies the data structure among several data structures of the same type.

According to a twelfth example, there is provided a method comprising:
    receiving a first request that requests a part of a file, the first request comprising an identification of a data structure, the identification comprising a type and an identifier, wherein the identifier identifies the data structure among several data structures of the same type;
    concluding the part of the file, said concluding comprising identification of the data structure based on the type and the identifier;
    responding to the first request by transmitting the part of the file.

BRIEF DESCRIPTION OF THE DRAWINGS

Figure 1:
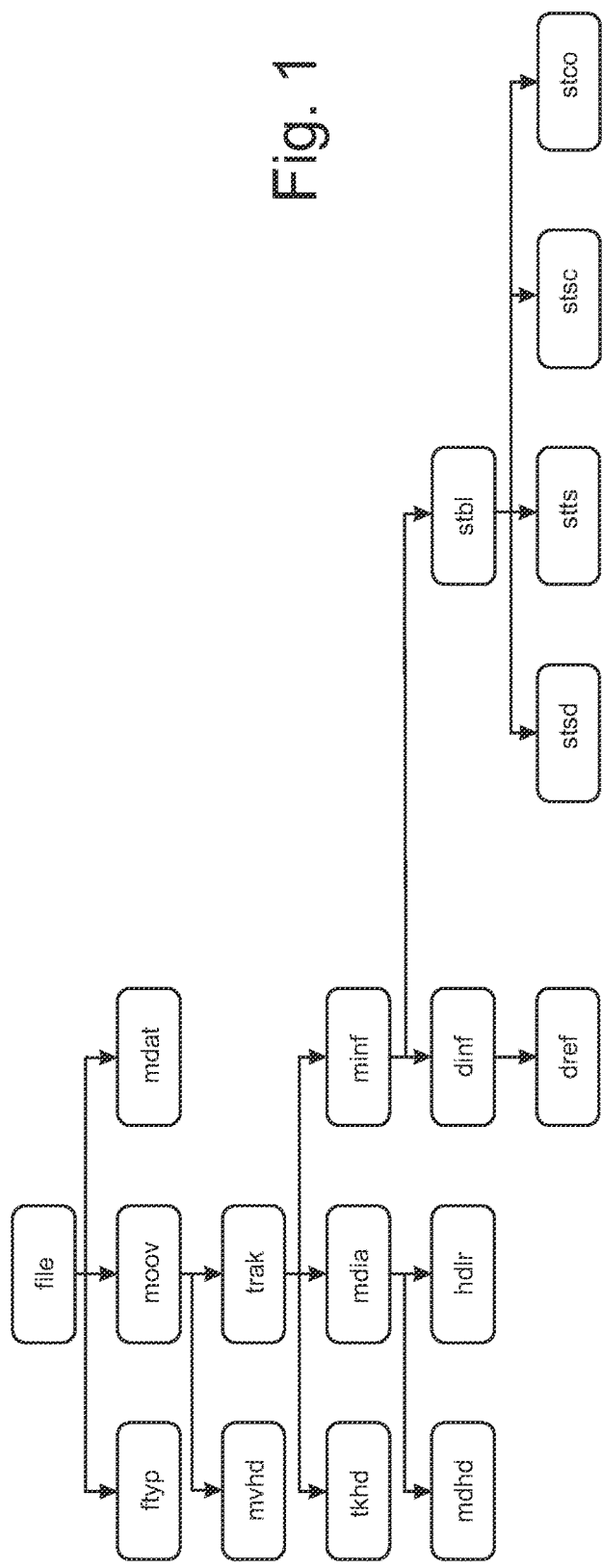
Figure 2:
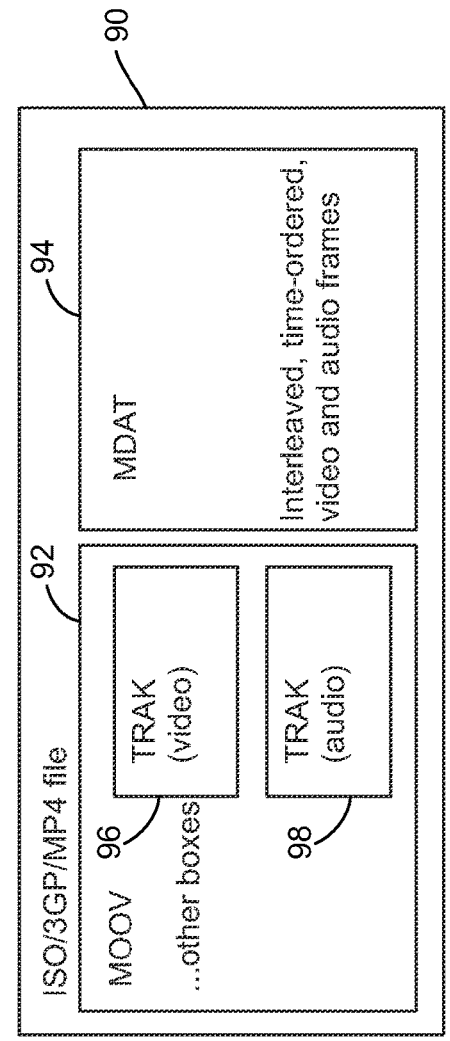
Figure 3B:
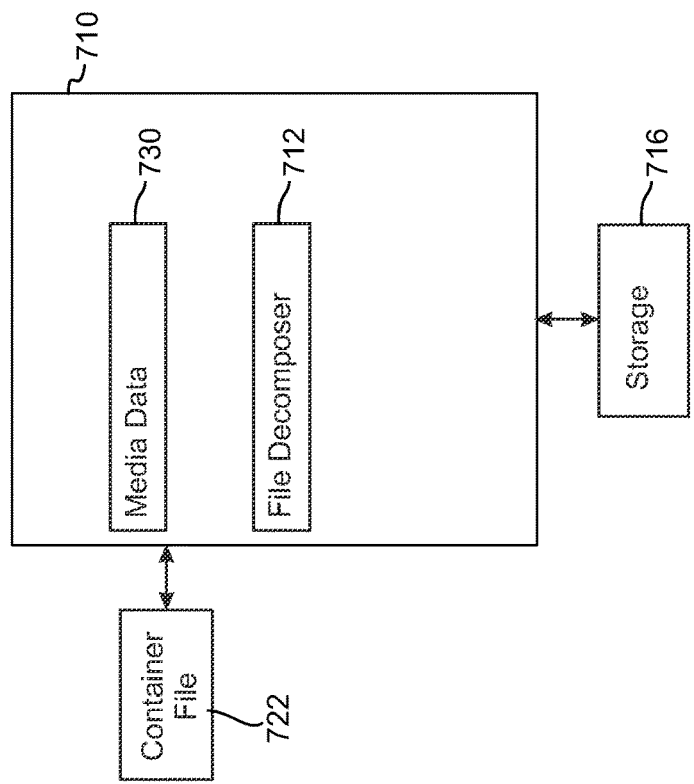
Figure 3A:
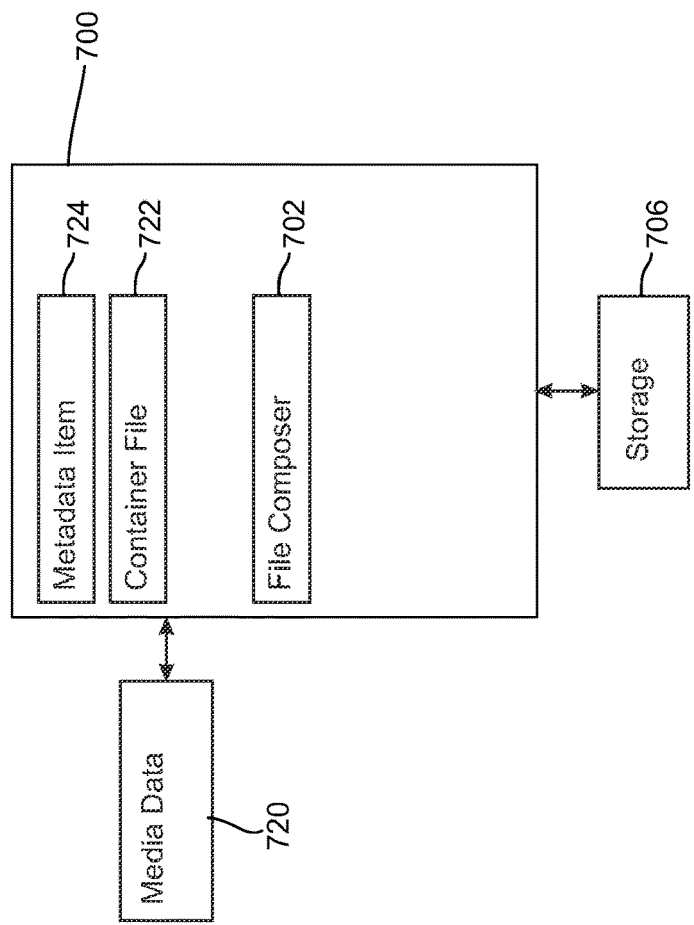
Figure 5:
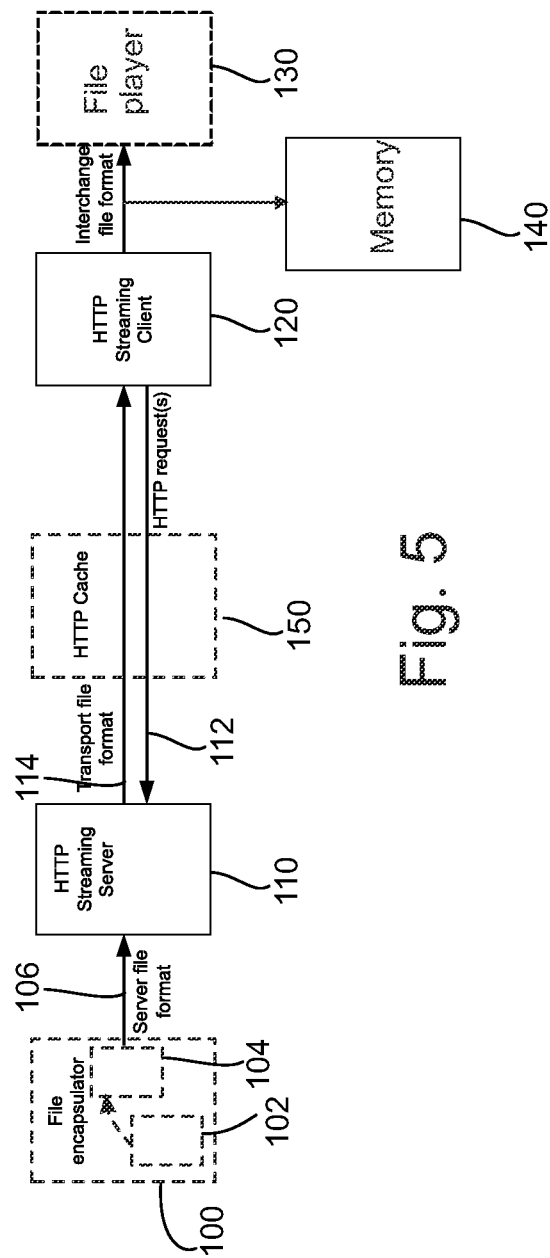
Figure 6A:
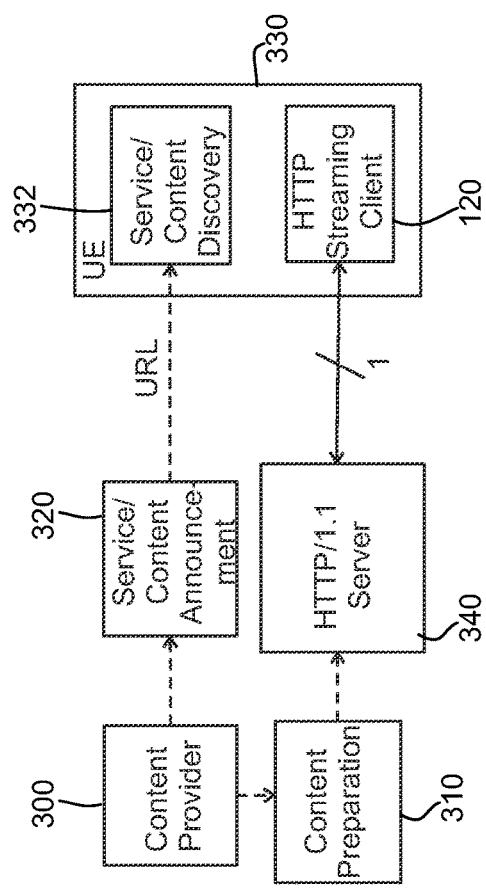
Figure 6B:
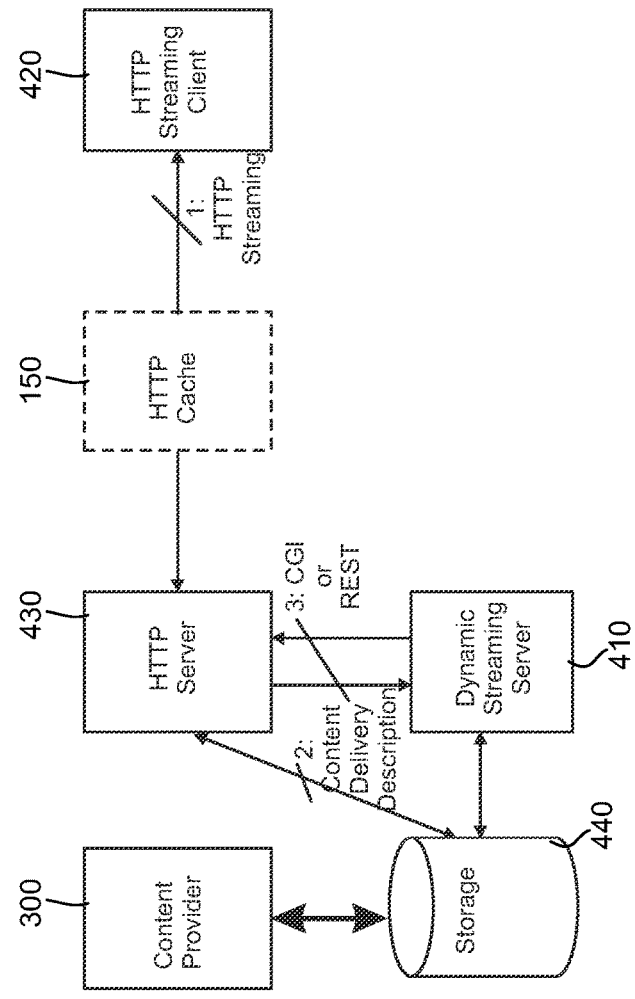
Figure 7:
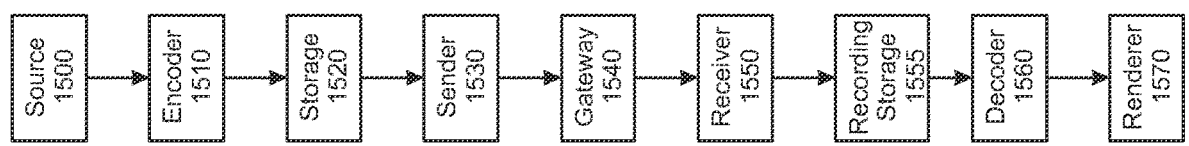
Figure 9:
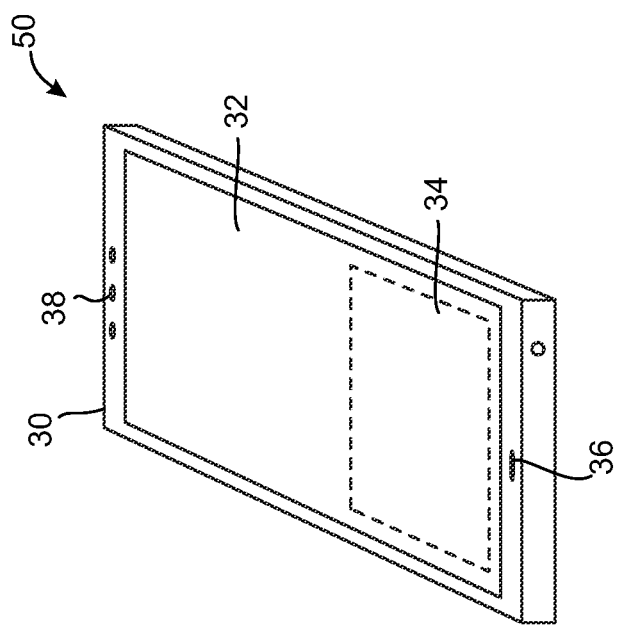
Figure 8:
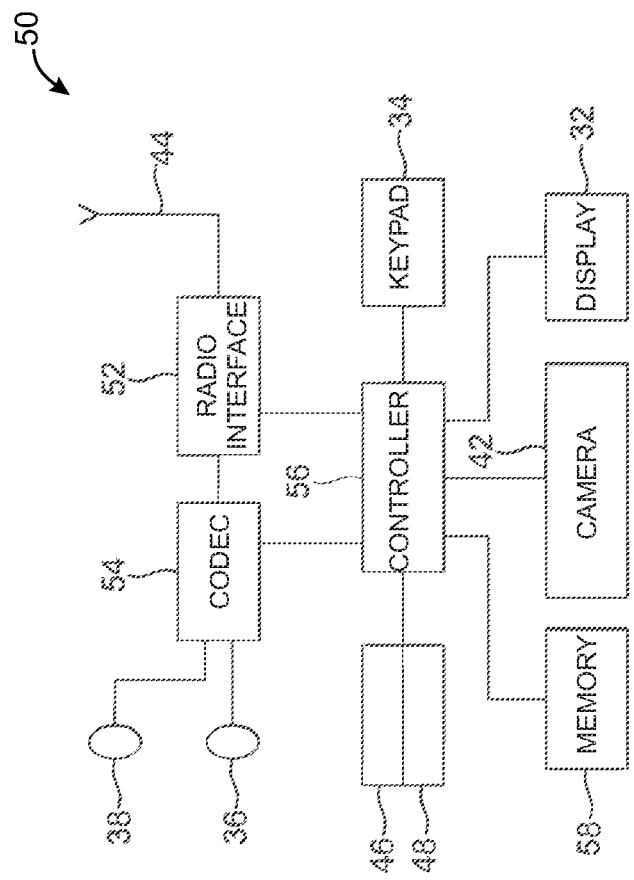
Figure 10:
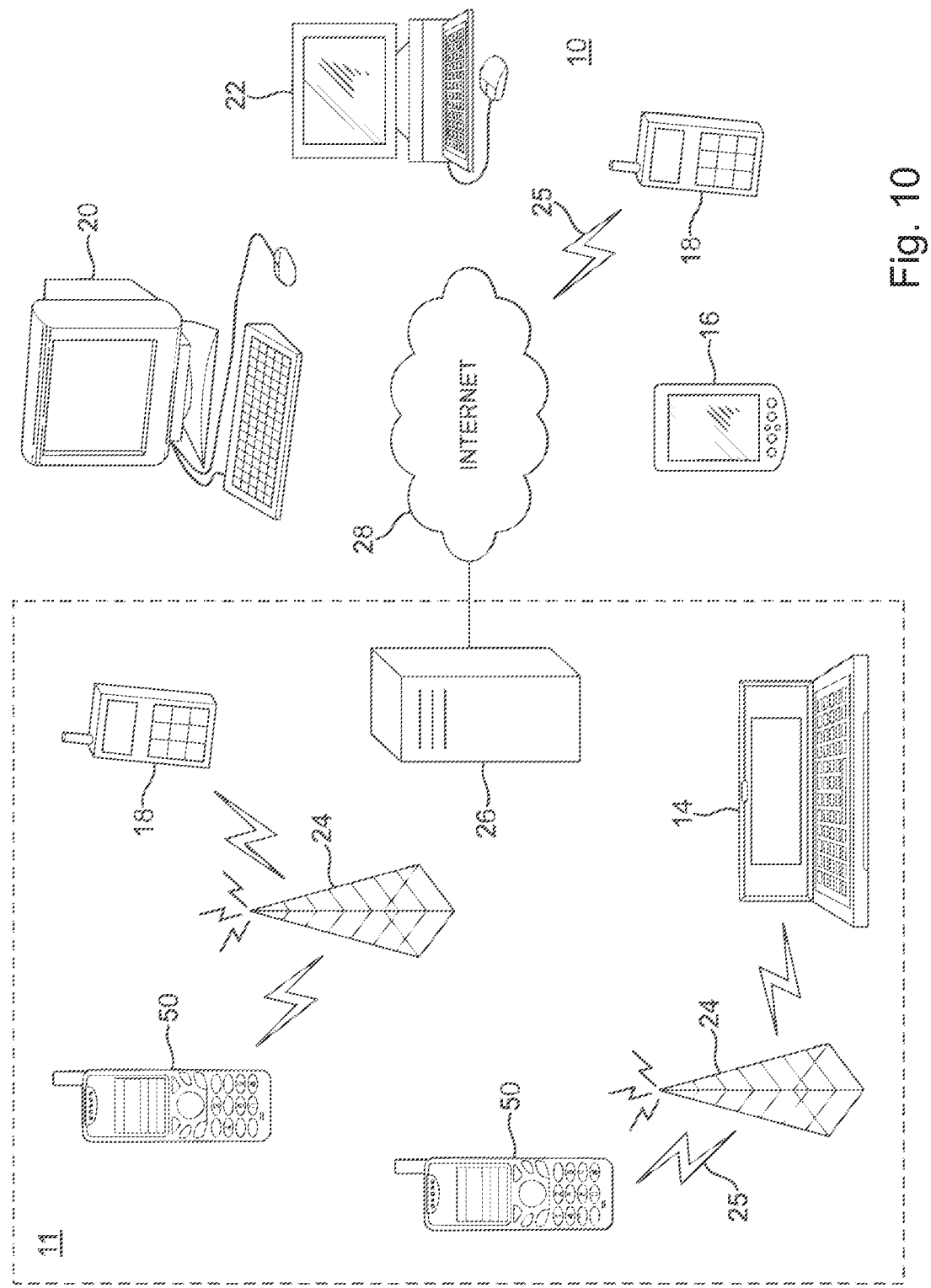

Having thus described some embodiments of the invention in general terms, reference will now be made to the accompanying drawings, which are not necessarily drawn to scale, and wherein:

FIG. 1 shows an example containment hierarchy of International Organization for Standardization base media file format box structures;

FIG. 2 illustrates a simplified file structure according to the ISO base media file format;

FIG. 3a depicts an example of an apparatus suitable for composing media files;

FIG. 3b depicts an example of an apparatus suitable for decomposing container files;

FIG. 4a depicts a flow diagram of a method for composing media files, in accordance with an embodiment;

FIG. 4b depicts a flow diagram of a method for decomposing media files, in accordance with an embodiment;

FIG. 5 depicts an example illustration of some functional blocks, formats, and interfaces included in an HTTP streaming system;

FIG. 6a illustrates an example of a regular web server operating as a HTTP streaming server;

FIG. 6b illustrates an example of a regular web server connected with a dynamic streaming server;

FIG. 7 shows schematically an electronic device employing some embodiments of the invention;

FIG. 8 shows schematically a user equipment suitable for employing some embodiments of the invention;

FIG. 9 further shows schematically electronic devices employing embodiments of the invention connected using wireless and/or wired network connections; and FIG. 10 is a graphical representation of an example of a generic media communication system within which various embodiments may be implemented.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Some further definitions used in this specification may be described as follows. A coding format (which may also be referred to as media compression format) may relate to an action of a specific coding algorithm that codes content information into a bitstream. Media data may be defined as a sequence of bits that forms a coded representation of multimedia, e.g., coded representation of pictures, coded representation of an image or images, coded representation of audio or speech, coded representation of graphics. Coded representation of multimedia usually conforms to a coding format, such as H.264/AVC, H.265/HEVC, AMR, etc. A container file format may comprise means of organizing the generated bitstream in such a way that it may be accessed for decoding and playback, transferred as a file, or streamed, all possibly utilizing a variety of storage and transport architectures. Furthermore, a container file format can facilitate interchange and editing of the media as well as recording of received real-time streams to a file. Metadata may be understood to comprise structural or descriptive information about media data.

When media data is stored using a container file format, at least part of the metadata may be represented by the file format structures of the container file format. However, a part of the metadata may be represented using a metadata format that is distinct from the container file format. For example, the metadata format and the container file format may be specified in different specifications and/or they may use different basic units or elements. For example, the container file format may be based on elements comprising key-length-value triplets, where the key indicates the type of information, the length indicates the size of the information, and the value comprises the information itself. The box structure used in the ISO Base Media File Format may be regarded as an example of a container file element comprising of a key-length-value triplet. Continuing the same example, a metadata format may be based on an XML (Extensible Markup Language) schema.

Some media file format standards include ISO base media file format (ISO/IEC 14496-12, which may be abbreviated ISOBMFF), MPEG-4 file format (ISO/IEC 14496-14, also known as the MP4 format), ISO/IEC 14496-15 ("Carriage of network abstraction layer (NAL) unit structured video in the ISO base media file format", which may be used for H.264/AVC and/or H.265/HEVC), the High Efficiency Image File Format (ISO/IEC 23008-12, which may be abbreviated HEIF) and 3GPP ($3^{rd}$ Generation Partnership Project) file format (3GPP TS 26.244, also known as the 3GP format). The file format for scalable video coding (SVC) and the multiview video coding (MVC) extensions of H.264/AVC as well as the multi-layer extensions (MV-HEVC, SHVC, 3D-HEVC) of H.265/HEVC are specified as part of ISO/IEC 14496-15. The ISO file format is the base for derivation of all the above mentioned file formats, excluding the ISO file format itself.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

One building block in the ISO base media file format is called a box. For example, coded sample data referred from a MovieBox or a MovieFragmentBox may always reside in a MediaDataBox. Each box may have a header and a payload. The box header indicates the type of the box and the size of the box in terms of bytes. All media data and its related metadata may be encapsulated into boxes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes. Each box of the ISO base media file may be identified by a four character code (4CC, fourCC). A four-character code may interchangeably be represented by a 32-bit unsigned integer (by assuming a certain conversion of characters to 8-bit values, a certain bit endianness, and a certain byte endianness). The header may provide information about the type and size of the box. An example containment hierarchy of ISOBMFF box structures is shown in FIG. 1.

The ISOBMFF is designed considering a variety of use cases; such uses cases may include (a) content creation (b) interchange (c) communication and (d) local and streamed presentation. The Dynamic Adaptive Streaming over HTTP (DASH) is an example of a communication format that uses ISOBMFF for its objectives. While DASH was originally meant as a format that is transported over HTTP (Hypertext Transfer Protocol), it has also found uses in 3GPP based protocols such as MBMS (multimedia broadcast/multicast service) and DVB (Digital Video Broadcasting) based IP (Internet Protocol) broadcasts. While some of these transmission protocols are bi-directional, some are uni-directional. Furthermore, some of these transmission protocols operate in a loss prone environment.

According to ISOBMFF, a file may include media data and metadata that may be enclosed in separate boxes. The media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track box. A track may be, for example, one of the following types: media, hint, timed metadata. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and may include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, one media track may be selected. Samples of a track may be implicitly associated with sample numbers that may be incremented e.g. by 1 in the indicated decoding order of samples. The first sample in a track may be associated with sample number 1.

The 'trak' box contains a Sample Table box. The Sample Table box comprises e.g. all the time and data indexing of the media samples in a track. The Sample Table box is required to contain a Sample Description box. The Sample Description box includes an entry count field, specifying the number of sample entries included in the box. The Sample Description box is required to contain at least one sample entry. The sample entry format depends on the handler type for the track. Sample entries give detailed information about the coding type used and any initialization information needed for that coding.

FIG. 2 illustrates an example of a simplified file structure according to the ISO base media file format. As shown in FIG. 2, the file 90 may include the moov box 92 and the mdat box 94 and the moov box 92 may include tracks (trak 96 and trak 98) that correspond to video and audio, respectively.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, which may also be included in each track, may define an indexed list of uniform resource locators (URLs), uniform resource names (URNs), and/or self-references to the file containing the metadata. A sample entry may point to one index of the Data Reference box (which, in the syntax, may be referred to as DataReferenceBox), thereby indicating the file containing the samples of the respective chunk or track fragment.

DataReferenceBox contains a list of boxes that declare the potential location(s) of the media data referred to by the file. DataReferenceBox is contained by DataInformationBox, which in turn is contained by MediaInformationBox or MetaBox. When contained in the MediaInformationBox, each sample entry of the track contains a data reference index referring to a list entry of the list of box(es) in the DataReferenceBox. When contained in the MetaBox, the ItemLocationBox gives, for each item, the data reference index referring to a list entry of the list of box(es) in the DataReferenceBox. The box(es) in the DataReferenceBox are extended from FullBox, i.e. contain the version and the flags field in the box header. Two box types have been specified to be included in the DataReferenceBox: DataEntryUrlBox and DataEntryUrnBox provide a URL and URN data reference, respectively. When the least significant bit of the flags field of either DataEntryUrlBox or DataEntryUrnBox is equal 1, the respective data reference refers to the containing file itself and no URL or URN string is provided within the DataEntryUrlBox or the DataEntryUrnBox.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These may be distinguished by a type field used to indicate the type of grouping. The 'sbgp' and the 'sgpd' boxes may be linked using the value of grouping_type and, in some versions of the boxes, also the value of grouping_type_parameter. The 'sbgp' box indicates the index of the sample group description entry that a particular sample belongs to.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (four-character code: 'dinf'). In the specific case that the metadata is formatted using XML syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource; the resource can be formed by concatenating the extents.

In order to support more than one meta box at any level of the hierarchy (file, movie, or track), a meta box container box ('meco') may be used as one ISO base media file format. The meta box container box may carry any number of additional meta boxes at any level of the hierarchy (file, movie, or track). This may allow that e.g. the same metadata is being presented in two different, alternative metadata systems. The meta box relation box ('mere') may enable describing how different meta boxes relate to each other, e.g. whether they contain exactly the same metadata (but described with different schemes) or if one represents a superset of another one.

High Efficiency Image File Format (HEIF) is a standard developed by the Moving Picture Experts Group (MPEG) for storage of images and image sequences. The standard facilitates file encapsulation of data coded according to High Efficiency Video Coding (HEVC) standard. HEIF includes a rich set of features building on top of the used ISO Base Media File Format (ISOBMFF).

HEIF enables a wide range of use cases varying from still picture capture, storage and sharing to multi-image use cases, such as sharing of image bursts or storing sets of images for the purpose of processing those by means of computational photography. Computational photography forms a new category of use cases that can benefit from the HEIF. A set of related images can be stored in a single file with associated metadata indicating relationships between different pictures. Examples of such emerging use cases include refocusing the shot by selecting an image with a desired focus from a set of picture captured with different focal lengths, high dynamic range photography by combining pictures with different exposures, and building of omnidirectional or panoramic images from a set of pictures with connected scenery.

The ISOBMFF structures and features are used to a large extent in the design of HEIF, and HEIF files also conform to ISOBMFF. The basic design for HEIF comprises that still images are stored as items and image sequences are stored as tracks. Any number of image items can be stored in the same file.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Internet media types, also known as MIME (Multipurpose Internet Mail Extension) types, are used by various applications to identify the type of a resource or a file. MIME types consist of a media type, a subtype, and zero or more optional parameters.

As described, MIME is an extension to an email protocol which makes it possible to transmit and receive different kinds of data files on the Internet, for example video and audio, images, software, etc. An internet media type is an identifier used on the Internet to indicate the type of data that a file contains. Such internet media types may also be called as content types. Several MIME type/subtype combinations exist that can indicate different media formats. Content type information may be included by a transmitting entity in a MIME header at the beginning of a media transmission. A receiving entity thus may need to examine the details of such media content to determine if the specific elements can be rendered given an available set of codecs. Especially, when the end system has limited resources, or the connection to the end systems has limited bandwidth, it may be helpful to know from the content type alone if the content can be rendered.

Two parameters, 'codecs' and 'profiles', are specified to be used with various MIME types or type/subtype combinations to allow for unambiguous specification of the codecs employed by the media formats contained within, or the profile(s) of the overall container format.

By labelling content with the specific codecs indicated to render the contained media, receiving systems can determine if the codecs are supported by the end system, and if not, can take appropriate action (such as rejecting the content, sending notification of the situation, transcoding the content to a supported type, fetching and installing the required codecs, further inspection to determine if it will be sufficient to support a subset of the indicated codecs, etc.). For file formats derived from the ISOBMFF, the codecs parameter may be considered to comprise a comma-separated list of one or more list items. When a list item of the codecs parameter represents a track of an ISOBMFF compliant file, the list item may comprise a four-character code of the sample entry of the track.

The profiles MIME parameter can provide an overall indication, to the receiver, of the specifications with which the content complies. This is an indication of the compatibility of the container format and its contents to some specification. The receiver may be able to work out the extent to which it can handle and render the content by examining to see which of the declared profiles it supports, and what they mean. The profiles parameter for an ISOBMFF file may be specified to comprise a list of the compatible brands included in the file.

Hypertext Transfer Protocol (HTTP) is widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

The chunked transfer coding (a.k.a. chunked delivery) of HTTP wraps the payload body, e.g. of an HTTP GET response, in order to transfer it as a series of chunks, each with its own size indicator. Chunked transfer coding enables content streams of unknown size to be transferred as a sequence of length-delimited buffers, which enables the sender to retain connection persistence and the recipient to know when it has received the entire message.

ISO/IEC International Standard 23009-1 specifies dynamic adaptive streaming over HTTP (DASH). Some concepts, formats, and operations of MPEG-DASH are described below as an example of a video streaming system, wherein the embodiments may be implemented. The aspects of the invention are not limited to MPEG-DASH, but rather the description is given for one possible basis on top of which the invention may be partly or fully realized.

In dynamic adaptive streaming over HTTP (DASH), the multimedia content may be captured and stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

The media presentation description (MPD) may provide information for clients to establish a dynamic adaptive streaming over HTTP. MPD may contain information describing media presentation, such as an HTTP-uniform resource locator (URL) of each Segment to make GET Segment request. In DASH, hierarchical data model may be used to structure media presentation as summarized in the following. A media presentation may comprise a sequence of one or more Periods, each Period may contain one or more Groups, each Group may contain one or more Adaptation Sets, each Adaptation Set may contain one or more Representations, and each Representation may comprise one or more Segments. A Representation is one of the alternative choices of the media content or a subset thereof which may differ by the encoding choice, e.g. by bitrate, resolution, language, codec, etc. The Segment may contain certain duration of media data, and metadata to decode and present the included media content. A Segment may be identified by a uniform resource indicator (URI) and can be requested by a HTTP GET request. A Segment may be defined as a unit of data associated with an HTTP-URL and optionally a byte range that are specified by an MPD.

A DASH service may be provided as an on-demand service or live service. In the former, the MPD is static and all Segments of a Media Presentation are already available when a content provider publishes an MPD. In the latter, however, the MPD may be static or dynamic depending on the Segment URLs construction method employed by a MPD and Segments may be created continuously as the content is produced and published to DASH clients by a content provider. Segment URLs construction method may be either template-based Segment URLs construction method or the Segment list generation method. In the former, a DASH client may be able to construct Segment URLs without updating an MPD before requesting a Segment. In the latter, a DASH client may need to periodically download the updated MPDs to get Segment URLs. For live service, hence, the template-based Segment URLs construction method may be superior to the Segment list generation method.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment may be defined as a Segment that complies with the container file format and/or the media format or formats in use and enables playback when combined with zero or more preceding segments, and an Initialization Segment (if any). A Media Segment may contain certain duration of media data for playback at a normal speed, such duration may be referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration may be a lower bound on the end-to-end latency perceived by a DASH client since a Segment is a discrete unit of generating media data for DASH. Content generation may be done in such a manner that a whole Segment of media data is made available for a server. Furthermore, many client implementations may use a Segment as the unit for GET requests. Thus, in some arrangements for live services a Segment can be requested by a DASH client only when the whole duration of Media Segment is available as well as encoded and encapsulated into a Segment. For on-demand service, different strategies of selecting Segment duration may be used.

A Segment may further be partitioned into Subsegments e.g. to enable downloading segments in multiple parts. Subsegments may be required to contain complete access units. Subsegments may be indexed by Segment Index box(es) (which in syntax may be referred to as SegmentIndexBox), which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

Each media segment may be assigned a unique URL (possibly with byte range), an index, and explicit or implicit start time and duration. Each media segment may contain at least one stream access point, which is a random access or switch-to point in the media stream where decoding can start using only data from that point forward.

To enable downloading segments in multiple parts, a method of signaling subsegments using a segment index box may be utilized. This box describes subsegments and stream access points in the segment by signaling their durations and byte offsets. The DASH client may use the indexing information to request subsegments using partial HTTP GET requests. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

MPEG-DASH defines segment-container formats for both ISO Base Media File Format and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other levell elements and padding. A Segment Index of DASH may comprise a Cues Element of Matroska.

DASH supports rate adaptation by dynamically requesting Media Segments and/or Subsegments from different Representations within an Adaptation Set to match varying network bandwidth. When a DASH client switches up/down Representation, coding dependencies within Representation may need to be taken into account. In media decoding, a Representation switch may only happen at a random access point (RAP), which may be used in video coding techniques such as H.264/AVC. In order to avoid requesting and transmitting of media data that will not be decoded, RAPs may be aligned at the beginning of Media Segments and/or Subsegments, and the MPD and/or the segment index box may be used to indicate alignment of RAPs at the beginning of Media Segments and/or Subsegments. Consequently, DASH clients may be able to conclude which Segments and/or Subsegments to request so that when Representation switching is performed the first Segment and/or Subsegment of a destination Representation starts with a RAP and the Segments and/or Subsegments of the source and destination Representation are aligned (time-wise). In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

Streaming systems similar to MPEG-DASH include for example HTTP Live Streaming (a.k.a. HLS), specified in the IETF Internet Draft draft-pantos-http-live-streaming-13 (and other versions of the same Internet Draft). As a manifest format corresponding to the MPD, HLS uses an extended M3U format. M3U is a file format for multimedia playlists, originally developed for audio files. An M3U Playlist is a text file that consists of individual lines, and each line is a URI, blank, or starts with the character '#' indicating a tag or a comment. A URI line identifies a media segment or a Playlist file. Tags begin with # EXT. The HLS specification specifies a number of tags, which may be regarded as key-value pairs. The value part of tags may comprise an attribute list, which is a comma-separated list of attribute-value pairs, where an attribute-value pair may be considered to have the syntax AttributeName=AttributeValue. Hence, tags of HLS M3U8 files may be considered similar to Elements in MPD or XML, and attributes of HLS M3U8 files may be considered similar to Attributes in MPD or XML. Media segments in HLS are formatted according to the MPEG-2 Transport Stream and contain a single MPEG-2 Program. Each media segment is recommended to start with a Program Association Table (PAT) and a Program Map Table (PMT).

A hypertext mark-up language version 5.1 (HTML 5.1) supports a number of use cases in which the content author may use multiple image resources that a user agent (e.g. a web browser) can choose from. For example, different users might have different environmental characteristics; authors might want to show the same image content but with different rendered size and/or using different image formats; and/or authors might want to show different image content.

In the following, some non-limiting examples of the environmental characteristics will be shortly discussed. The user device's physical screen size might be different from one device to another. As an example, a screen of a mobile phone might be smaller than a screen of a laptop computer. This difference may only be relevant when an image's rendered size depends on a viewport size. The user device's screen pixel density might also be different in different devices. Different devices may further have different pixel densities regardless of their physical screen size. For example, a screen of one mobile phone might have more physical pixels per inch compared to a screen of another mobile phone. There may also be differences in zoom levels between devices, or the zoom level might change for a single user over time. As an example, a user might zoom in to a particular image to be able to get a more detailed look. The zoom level and the screen pixel density may both affect the number of physical screen pixels per CSS pixel (cascading style sheet-language). This ratio may be referred to as a device-pixel-ratio. Furthermore, screen orientation might be different in different devices, or might change for a single user over time. As an example, a tablet computer can be held upright or rotated 90 degrees, so that the screen is either "portrait" or "landscape". There may also be differences in users' network speed, network latency and bandwidth cost, or might change for a single user over time. A user might be using on a fast, low-latency and constant-cost connection while at work, on a slow, low-latency and constant-cost connection while at home, and on a variable-speed, high-latency and variable-cost connection anywhere else.

In the following, some non-limiting examples of showing the same image content but with different rendered size and/or using different image formats will be provided. Selecting a rendered size may depend on, for example, a width of a viewport. This may be referred to as viewport-based selection.

A web page might have a banner at the top that may always span the entire viewport width. In this case, the rendered size of the image depends on the physical size of the screen (assuming a maximized browser window).

Another web page might have images in columns, with a single column for screens with a small physical size, two columns for screens with medium physical size, and three columns for screens with big physical size, with the images varying in rendered size in each case to fill up the viewport. In this case, the rendered size of an image might be bigger in the one-column layout compared to the two-column layout, despite the screen being smaller.

Authors of web content might want to show different image content depending on the rendered size of the image. This may be referred to as art direction.

When a web page is viewed on a screen with a large physical size (assuming a maximized browser window), the author might wish to include some less relevant parts surrounding the critical part of the image. When the same web page is viewed on a screen with a small physical size, the author might wish to show only the critical part of the image.

Authors of web pages might want to show the same image content but using different image formats, depending on which image format(s) the user agent supports. This is usually referred to as image format based selection.

A web page might have some images in the JPEG (Joint Photographic Experts Group), WebP and JPEG XR (JPEG eXtended Range) image formats, with the latter two reportedly having better compression abilities compared to JPEG. Since different user agents may support different image formats, with some formats offering better compression ratios, the author might like to serve the better formats to user agents that support them, while providing JPEG fallback for user agents that don't support better formats.

The above situations are not mutually exclusive. For example, it may be reasonable to combine different resources for different device-pixel-ratio with different resources for art direction.

HTML 5.1 as well as elder versions of HTML include an img element that represents an image. The img element may include a src attribute, referencing a non-interactive, optionally animated, image resource that is neither paged nor scripted. As also elder HTML versions parse the src attribute, the image provided through the src attribute can be considered the default or the fallback image.

The img element may also contain a srcset attribute. If present, it contains one or more comma-separated image candidate strings.

An image candidate string may comprise the following components, in order, with the further restrictions described below this list. First, the image candidate may contain zero or more space characters; then a valid non-empty uniform resource locator (URL) that does not start or end with a comma character (,), referencing a non-interactive, optionally animated, image resource that is neither paged nor scripted. After the uniform resource locator there may be zero or more space characters followed by zero or one of a width descriptor and a pixel density descriptor. Finally, there may be zero or more space characters.

The width descriptor may comprise a space character, a valid non-negative integer giving a number greater than zero representing the width descriptor value, and a latin small letter "w" character.

The pixel density descriptor may comprise a space character, a valid floating-point number giving a number greater than zero representing the pixel density descriptor value, and a latin small letter "x" character.

The descriptors may be used for characterizing the image candidate and hence for selecting an appropriate image meeting the desired characteristics.

The img element may or may not be contained by a picture element in HTML 5.1.

HTML 5.1 includes the picture element, which contains zero or more source elements, followed by one img element. The picture element is a container which provides multiple sources to its contained img element to allow authors to declaratively control or give hints to the user agent about which image resource to use, based on the screen pixel density, viewport size, image format, and other factors. It represents its children.

The source element within a picture element may allow authors to specify multiple alternative source sets for img elements. The source element within a picture element may include the srcset attribute, may and conditionally has to include the sizes attribute, when the srcset attribute includes a width descriptor among any image candidate string, optionally includes the media attribute, and optionally includes the type attribute. The media attribute contains a valid media query list. The type attribute contains a valid MIME type. The sizes, media, and type attributes, when present, may characterize the source set (i.e., the images identified in the srcset attribute of the same source element) and hence may be used for selecting an appropriate source set meeting the desired application characteristics or preferences. Further, from this source set, an appropriate image may then be selected.

Links are conceptual constructs, created by a, area, and link elements, that represent a connection between two resources, one of which is a current document. There may be two kinds of links in HTML. The first type is a links to an external resource. Links to external resources may be used to augment the current document, generally automatically processed by the user agent. The second type is a hyperlink. Hyperlinks are links to other resources that are generally exposed to the user by the user agent so that the user can cause the user agent to navigate to those resources, e.g. to visit them in a browser or download them.

For link elements with an href attribute and a rel attribute, links should be created for the keywords of the rel attribute, as defined for those keywords. Similarly, for a and area elements with an href attribute and a rel attribute, links should be created for the keywords of the rel attribute as defined for those keywords. Unlike link elements, however, a and area element with an href attribute that either do not have a rel attribute, or whose rel attribute has no keywords that are defined as specifying hyperlinks, should also create a hyperlink. This implied hyperlink may have no special meaning (it has no link type) beyond linking the element's node document to the resource given by the element's href attribute.

A number of link types have been specified in HTML 5.1 as well as in other specifications. A link type is specified as a specific character string used as the value of the rel attribute. For example, the prefetch link type specifies that the target resource should be preemptively cached.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. A URI comprises a scheme part (identifying e.g. the protocol for the URI) and a hierarchical part identifying the resource, and these two parts are separated by a colon character. A URI may optionally comprise a query part (separated by the character '?') and/or a fragment part (separated by the character '#'). The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

URL fragment identifiers (which may also be referred to as URL forms) may be specified for a particular content type to access a part of the resource, such as a file, indicated by the base part of the URL (without the fragment identifier). URL fragment identifiers may be identified for example by a hash ('#') character within the URL. For the ISOBMFF, it may be specified that URL fragments "# X" refer to a track with track_ID equal to X, "# itemID=" and "# item_name=" refer to file level meta box(es), "#/item_ID=" and "#/item_name=" refer to the meta box(es) in the Movie box, and "# track_ID=X/item_ID=" and "# track_ID=X/item_name=" refer to meta boxes in the track with track_ID equal to X, including the meta boxes potentially found in movie fragments.

In ISOBMFF the exact location of samples referred to by a TrackBox (i.e. excluding samples referred to by movie fragments) may be computed using information provided by (a) DataReferenceBox (b) SampleToChunkBox (c) ChunkOffsetBox, and (d) SampleSizesBox. Furthermore, the locating of a sample involves an offset calculation using the start of the file. For sample referred to by movie fragments, the exact location of samples may be computed using information provided in TrackFragmentHeaderBox, and TrackFragmentRunBox, and the locating of a sample may involve an offset calculating using either the start of the file or the start of the Movie Fragment Box as a reference. The use of offsets may render the file fragile to any edits. For example, it may be sufficient to simply add or delete a byte between the start of a file and a MediaDataBox to destroy the computed offsets and render the file non-decodable. This means that any entity that is editing a file should be careful to ensure that all offsets computed and set in the file must be valid after it completes its editing.

URL fragments enable requesting a part of a file or resource, e.g. using an HTTP GET request. However, if the file subject to partial reception using URL fragments uses addressing relative to the start of the file, it can be challenging for a server to return a valid resource complying with the file format (e.g. ISOBMFF) or it may be impossible for a player to parse the resource resulting from the resolved request.

In the following, two distinct examples of use cases that result into partial file reception will be provided.

The first example relates to intentional partial file reception. In this example, a container file is available in a server. The container file contains media tracks and/or items, out of which a subset is sufficient for consumption (e.g. displaying or playing back). For example, the container file may be an image container file, containing the same original image in multiple coded versions, e.g. with different codecs and/or different spatial resolutions. It is sufficient to fetch a subset of the coded images for displaying, e.g. a thumbnail image, which can be displayed while another image suitable for the display resolution is being downloaded. The client hence requests a subset of media tracks and/or items from the file individually or in suitable bundles. A single container file can be preferable for content management in server(s) and/or in content delivery network(s).

The second example relates to accidental partial file reception. Files may be transmitted using unreliable protocols, such as the MBMS file delivery stack (multimedia broadcast and multicast service specified by the Third Generation Partnership Project, 3GPP). It can be assumed that losses can be detected so that it is known if a box has been incompletely received. However, parts of received files can be missing. A receiver may not be able to easily conclude if a partially received file is valid or conforming. It might not be appropriate to store the partially received file in a manner where the file is indicated to conform to a format, such as ISOBMFF, where the file is indicated or assumed to be error free. Likewise, it might not be appropriate to process the partially received file with file parser and/or media decoder(s) that assume an error-free file and/or error-free media bitstreams(s), respectively.

For certain box types ISOBMFF allows several boxes of the same four-character code to appear in the same level in the file hierarchy. For example, it is allowed to have several MediaDataBoxes in the root level of the file. Certain boxes may contain references or alike to other boxes e.g. using offsets, such as offsets relative to the beginning of file. For example, a MovieBox contains references, such as chunk offsets, that may refer to content in MediaDataBox(es). When a file is partially received, it needs to be ensured that the integrity of such references is maintained, in order to be able to parse the file correctly.

A transmission unit (Segment or Subsegment) in DASH may comprise one or more self-contained movie fragments, where a self-contained movie fragment may comprise a MovieFragmentBox and the MediaDataBox containing the media data described in the MovieFragmentBox). This design may incur a delay in the live content distribution, since the transmission unit can only be made available after all its media data has been coded. For example, a 1-second segment duration may cause roughly the same delay in the encoding and file encapsulation (plus the processing delay incurred in the encoding and encapsulation) to make the segments available.

In accordance with an embodiment, file-level boxes may be made self-standing as well as independent of the box order and presence of other file-level boxes. Such a file may be referred to as a reorderable file. In an embodiment, it is indicated in the file and/or in a description of the file whether the file is reorderable. In an embodiment, said indicating is performed by including a specific brand in the FileTypeBox indicating that the file is reorderable. In an embodiment, the specific brand indicates that all MediaDataBoxes include an identifier and that all file-internal media data references are relative to the respective MediaDataBox containing the media data. In an embodiment, a player conforming to the brand operates as follows. When MediaDataBox of a particular id_value is referred to (e.g. through a data reference as described in another embodiment) but no MediaDataBox with mdat_identifier equal to the id_value is present in the file, the player omits the processing of the associated track or item. Furthermore, the player omits the processing of any tracks or items depending on such an associated track or item. The player concludes such a dependency for example through a track reference or an item reference.

In an embodiment, a box of a box type that is allowed to appear more than once in the same hierarchy level of the file, such as the root level, is tagged with an identifier that differentiates it from other boxes of the same type in the same file hierarchy level or such an identifier is derived from the contents of the box. In an embodiment, said tagging or derivation is carried out only for those boxes or box types to which references from other box(es) may occur.

Since there may be many MediaDataBoxes contained in a file or in a referred file, there should be a way to recognize uniquely the MediaDataBox in which a sample is located. In an embodiment, a capability of recognizing a MediaDataBox out of many MediaDataBoxes is achieved by tagging each MediaDataBox with an identifier. There can be many methods to tag a MediaDataBox including but not limited to the following. As a first example, an identifier value, which may for example be an unsigned integer value of a certain bit count, may be affixed immediately after the box header of the box. According to another example a universally unique identifier (UUID) may be affixed after the box header of the box. In another example, an identifier, such as an MD5 checksum, is derived from a subset of the box contents or from the entire box and used to identify the box. As a yet another option, the reorderability may be constrained such that one or more box(es) of certain type immediately precede (or succeed) a MediaDataBox and contain the identifier of the MediaDataBox.

In accordance with an embodiment, the offsets, which may also be called addresses or pointers, indicated in the file are relative to the start of a box that contains the addressed data. In many cases, the addresses may be relative to the file-level box containing the addressed data. In an embodiment, offsets indicating samples are relative to the MediaDataBox containing the samples.

As the offsets may be included in a different file-level box than the data that the offsets are addressing, a box containing offsets may be associated with a box containing the addressed data. In an embodiment, the association may be implemented using an identifier, which may be called, for example, an mdat_identifier, which is included in each of the MediaDataBoxes contained in the file or a referenced file. A track that may utilize data from any of the MediaDataBoxes, may need to refer the MediaDataBox using its identifier, and an offset calculated using the start of the MediaDataBox as its reference. The location of item data within a file may be provided by referring to a particular MediaDataBox using its identifier and an offset relative to the start of that particular MediaDataBox.

The capability of reorderable files may make file editing easier. For example, in a situation in which a file containing a first track is added with a second track, the offsets of samples of the first track need not be re-derived, when the media data of the second track is placed in different MediaDataBox(es) than those containing the media data of the first track. When a track or item is added into a reorderable file, its media data can be included in a new MediaDataBox. The MovieBox is appended with a new TrackBox or item information. The location offset information of the tracks or items that were already present in the file does not have to be updated, because the offsets are relative to the MediaDataBox that carries the respective media data. The location offset information of the added track or item is relative to the newly added MediaDataBox and is hence also straightforward to compute. It is easy to locate the amended MovieBox into the beginning of the file, because no location offsets depend on the size of the boxes preceding the MediaDataBoxes in the file order. When a track or item is removed from a reorderable file, it can be checked if no other media data than that of the removed track or item is present in the MediaDataBox. If so, the MediaDataBox can be removed without affecting the location offsets of the remaining tracks or items. Likewise, the TrackBox or the item information can be removed from the file without a need to re-compute the location offsets of the remaining tracks and items.

In an embodiment, a URL fragment naming scheme is introduced to identify file-level boxes. A URL using that fragment naming scheme is resolved to a resource that consists of the file-level boxes identified by the URL fragment. As several boxes of the same name or type can exist in the file level, the URL fragment naming scheme also includes means to identify the file-level box from another file-level box of the same box type or name. For example, the above-described identifier of the MediaDataBox may be included in the URL fragment.

In an embodiment, a file and/or a description of the file or a representation includes information about the sequence of file-level boxes. The information may be regarded as a directory or a table of contents of the file. This information may be useful for example to inform a client about the download order required for an uninterrupted playback. The information may be such that URL fragments for file-level boxes can be generated based on the description. In an embodiment, identifiers of MediaDataBoxes may comprise a part of the information about the sequence of file-level boxes. In an embodiment, identifiers of MediaDataBoxes follow a numbering scheme that may be pre-defined e.g. in a standard or may be indicated in the information. When a MediaDataBox numbering scheme is in use, identifiers of MediaDataBoxes may not be present per each MediaDataBox, but rather can be derived from the numbering scheme for each MediaDataBox.

A partial file reception may be possible. In an embodiment, a receiver may be receiving or may have received file-level boxes. The receiver may have a-priori information or the receiver may conclude from indications in the file and/or in the description of the file that the file is reorderable. The receiver may write, into a received file, those file-level boxes that the receiver has correctly received. The receiver may provide the received file to a player and/or the player may retrieve the file from a memory, such as random access memory (RAM), flash memory, or solid state drive (SSD). In an embodiment, the player has a-priori information or concludes from indications in the file and/or in the description of the file that the file is reorderable. For example, the player may receive in a media presentation description a MIME type associated with a Representation, and conclude from the profiles parameter of the MIME type, when it includes a brand indicating a reorderable file or segments, that the file or segments are reorderable. The player may parse the information of the sequence of file-level boxes. The player may parse the file-level boxes of the received file in the order indicated in the information of the sequence of file-level boxes. The player may identify missing boxes of the received file by comparing the available boxes in the received file to the information of the sequence of file-level boxes. The player may handle identified missing data, for example, by notifying the user and/or by requesting the missing data from a server, e.g. using the URL fragment(s) associated with the missing file-level box(es).

In accordance with an embodiment, low-latency live streaming may be implemented as follows. In an embodiment, a streaming client may conclude, for example from the description of a Representation, that the segments use MediaDataBox relative offsets. For example, the streaming client may receive in a media presentation description a MIME type associated with a Representation, and conclude from the profiles parameter of the MIME type, when it includes a brand indicating the use of MediaDataBox relative offsets, that segments use MediaDataBox relative offsets. The streaming client may conclude, e.g. from the media presentation description, URL fragments for receiving a MovieFragmentBox or a segment header, and a respective MediaDataBox or a segment payload. The streaming client may also use in the conclusion other file-level boxes such as the SegmentIndexBox. The streaming client may request the URL fragments of the MovieFragmentBox or a segment header, and the MediaDataBox or a segment payload separately, e.g. using parallel HTTP connections. In an embodiment, the streaming client uses a URL fragment indicating a particular box or particular boxes, such as the box_id=moof for indicating the MovieFragmentBox of a segment and box_id=mdat for indicating the MediaDataBox of a segment for requesting the MovieFragmentBox and MediaDataBox separately e.g. using parallel HTTP connections. In an embodiment, a streaming client may separately request (e.g. using parallel HTTP connections) a segment header using a specific URL fragment, such as seghdr as described in another embodiment, and segment data using another specific URL fragment, such as segpayload as described in another embodiment. In an embodiment, a streaming client may request a segment header using a specific URL fragment, such as seghdr as described in another embodiment. The streaming client may conclude URL fragment of MediaDataBox(es) for the segment e.g. from the description of the representation. The streaming client may then separately request (e.g. using a parallel HTTP connection) the media data of the segment using the concluded URL fragment.

In an embodiment, a server may respond to a URL fragment request with chunked delivery of HTTP. The server may transmit first parts of the MovieFragmentBox or the segment header, and the respective MediaDataBox(es) or the segment payload prior to transmitting second parts of the same MovieFragmentBox or the segment header (respectively) and the same MediaDataBox(es) or the segment payload (respectively). The first parts may contain data up to the live edge, i.e. the data that is available so far. The first parts may be limited to be e.g. of integer number of TrackFragmentBoxes and the corresponding media data in MediaDataBox(es), i.e. avoiding to transmit partial TrackFragmentBoxes. The inherent latency related to encoding and file encapsulation may therefore be reduced and may be made as small as the "chunk" duration in chunked HTTP delivery.

In an embodiment, a media encapsulator is connected to the server. The media encapsulator may pack at least one coded media stream into a container file or a segment. The media encapsulator may provide the first parts of the MovieFragmentBox and the respective MediaDataBox to the server to be transmitted prior to finishing the encapsulation of the second parts of the same MovieFragmentBox and the same MediaDataBox.

Earlier in this specification it was mentioned that there may be several ways to tag MediaDataBox(es). In the following, an example of affixing an unsigned integer identifier value immediately after the box header of the box will be described in more detail.

The description, syntax, and semantics of the MediaDataBox in accordance with an embodiment are as follows, in accordance with an embodiment:
Box Type: 'mdat'
Container: File
Mandatory: No
Quantity: Zero or more ---
Syntax
---

```
aligned(8) class MediaDataBox extends Box('mdat') {
    unsigned int(32) mdat_identifier;
    bit(8) data[ ]; // until the end of the box
}
```

Semantics of the MediaDataBox is as follows, in accordance with an embodiment. The type indication (Box Type) reveals that the box is MediaDataBox. The parameter mdat_identifier is a 32 bit unsigned integer that is different from the mdat_identifier values of the other MediaDataBoxes of the file and that hence allows identification of this mdat box. The parameter data is the contained media data.

With this kind of contents, any MediaDataBox encapsulated in the file or a referred file may be uniquely identified by the mdat_identifier.

In accordance with an embodiment, a referred MediaDataBox is identified in a box contained in the DataReferenceBox for a track and hence associated with a data reference index value. When that data reference index value is referred to by a sample entry of the track, offset(s) related to indicating the sample location are relative to the MediaDataBox identified in box referred to be the data reference index value.

In accordance with an embodiment, a referred MediaDataBox is identified in a box contained in the DataReferenceBox for a MetaBox and hence associated with a data reference index value. When the data reference index value is referred for indicating an item location e.g. in ItemLocationBox, offset(s) related to indicating the item location are relative to the MediaDataBox identified in box referred to be the data reference index value.

Embodiments on identifying a MediaDataBox in a box contained in the DataReferenceBox are described in the following.

In an embodiment, a new box type is specified, e.g. with a name DataEntryIdentifiedMdatBox and a four-character code 'imdt', which can be contained a DataReferenceBox. The DataEntryIdentifiedMdatBox is specified to contain an identifier of the referred MediaDataBox, e.g. the 32-bit mdat_identifier field. When a file creator writes a file with offset(s) relative to a particular MediaDataBox, the file creator includes a DataEntryIdentifiedMdatBox with an identifier of that MediaDataBox in a DataReferenceBox. The file creator then authors the file so that the data reference index of the DataEntryIdentifiedMdatBox is associated with the offset(s).

In an embodiment, a URL or URN scheme is specified to identify a MediaDataBox within the containing file. In an embodiment, a URL fragment scheme (or equivalently a URN fragment scheme) as described in another embodiment is used with a URL or URN that indicates the containing file. A URL or URN with the fragment part is included (by a file creator) in a DataReferenceUrlBox or DataReferenceUrnBox.

In an embodiment, the URL or URN identifying the containing file includes in the scheme part "file:" and the hierarchical part is empty. An empty hierarchical part may be regarded as indicating a relative URL or URN that is relative to a base URI, which in this case (when the URL or URN is contained in the file) can be resolved to indicate the containing file itself, and consequently an empty hierarchical part can be resolved to indicate the containing file. The fragment part can be used to identify the MediaDataBox according to another embodiment. For example, the fragment part can be # box_id=mdat/mdat_identifier, where mdat_identifier is the identifier value of the MediaDataBox. Overall, an example of the URL or URN syntax to be induced in a DataReferenceUrlBox or DataReferenceUriBox is hence "file:# box_id=mdat/mdat_identifier".

In an embodiment, the URL or URN identifying the containing file has an empty scheme part and an empty hierarchical part. It may be indicated e.g. by the least significant bit of the flags field of the containing box (DataReferenceUrlBox or DataReferenceUrnBox) that the containing file itself is referred to, or it may be concluded from the contained URL or URN, e.g. based on it starting with a hash ('#') indicating a fragment part, that the URL or URN refers to the containing file itself.

When a file creator writes a file with offset(s) relative to a particular MediaDataBox, the file creator includes, in a DataReferenceBox, a DataReferenceUrlBox with a URL indicating the containing file itself and a URL fragment indicating the MediaDataBox in a DataReferenceBox. The file creator then authors the file so that the data reference index of the DataReferenceUrlBox is associated with the offset(s).

In an embodiment, a new bit (e.g. the second least significant bit) in the flags of the box header of a contained box within a DataReferenceBox is used for indicating that offset(s) if relative to a MediaDataBox of a particular identifier as follows. When the least significant bit of the flags field is equal 1 and the new bit of the flags field of is equal to 0, the offset(s) have a conventional reference point, typically the beginning of the containing file. When the least significant bit of the flags field is equal 1 and the new bit of the flags field of is equal to 1, the box includes an identification of the referred MediaDataBox and the offset(s) are relative to the referred MediaDataBox. In an embodiment, when the least significant bit of the flags field is equal 1 and the new bit of the flags field of is equal to 1 in a DataReferenceUrlBox, the URL included in the box comprises a URL fragment that identifies the MediaDataBox, according to another embodiment. For example, the fragment part can be # box_id=mdat/mdat_identifier, where mdat_identifier is the identifier value of the MediaDataBox. For example, the URL included in the box may be "# box_id=mdat/3456", which refers to the MediaDataBox with identifier equal to 3456. In another embodiment, when the least significant bit of the flags field is equal 1 and the new bit of the flags field of is equal to 1 in a DataReferenceUrlBox, the URL included in the box comprises an identifier of the MediaDataBox (i.e. needs not follow a URL fragment syntax).

In an embodiment, a new version value (e.g. equal to 2) of the box header of a box contained within a DataReferenceBox is used for indicating that offset(s) are relative to a MediaDataBox of a particular identifier as follows. When the least significant bit of the flags field is equal 1 and the version field has the new value, the box includes an identification of the referred MediaDataBox and the offset(s) are relative to the referred MediaDataBox. In an embodiment, when the least significant bit of the flags field is equal 1 and the version field is equal to a new value (e.g. 2) in a DataReferenceUrlBox, the URL included in the box is either empty or comprises a URL fragment. When the URL is empty, the entire containing file is indicated, and the offset(s) have a conventional reference point, typically the beginning of the containing file. When the URL comprises a URL fragment, it identifies the MediaDataBox, according to another embodiment. For example, the fragment part can be # box_id=mdat/mdat_identifier, where mdat_identifier is the identifier value of the MediaDataBox. For example, the URL included in the box may be "# box_id=mdat/3456", which refers to the MediaDataBox with identifier equal to 3456. In another embodiment, when the least significant bit of the flags field is equal 1 the version field is equal to a new value (e.g. 2) in a DataReferenceUrlBox, the URL included in the box comprises an identifier of the MediaDataBox (i.e. needs not follow a URL fragment syntax).

In an embodiment, a file parser parsing a file where a MediaDataBox is identified in a box contained in the DataReferenceBox operates as follows. A file parser concludes from the file (e.g. from a sample entry or from ItemLocationBox) which data reference index is associated with the offset(s) used for indicating the location of media data (e.g. for a sample or for an item, respectively). Based on the data reference index, the file parser finds the correct contained box (e.g. of type DataEntryIdentifiedMdatBox or DataEntryUrlBox in different embodiments) from the DataReferenceBox. The file parser parses the identifier of the MediaDataBox included in that correct contained box. The file parser finds the MediaDataBox that is associated with the identifier. The file parser finds the data referred to by the offset(s) by essentially adding the offset(s) to the start of the payload of the MediaDataBox. For example, when a data reference with a URL with a fragment of box_id=mdat/<id_value> is in use for a chunk, chunk_offset values in ChunkOffsetBox are relative to the beginning of the MediaDataBox with mdat_identifier equal to id_value.

In accordance with an embodiment that does not use the above-described amendments in the DataReferenceBox, chunk offsets relative to MediaDataBox(es) may be indicated as follows. In ISOBMFF chunk offsets are used to indicate the start location (within the file) of a set of contiguous samples described in MovieBox. In an embodiment, the offset calculation for chunks in the ChunkOffsetBox may be defined so that, instead of the offset being calculated from the start of the file, the offset is calculated from the beginning of the MediaDataBox that contains the chunk. To enable this, the syntax and semantics of the ChunkOffsetBox may be as illustrated below, in accordance with an embodiment.

| Syntax |
| --- |
| aligned(8) class ChunkOffsetBox<br>    extends FullBox('stco', version = 0, 0) {<br>    unsigned int(32)      entry_count;<br>    for (i=1; i <= entry_count; i++) {<br>        if (version == 1) {<br>            unsigned int(32)      mdat_identifier;<br>        }<br>        unsigned int(32)      chunk_offset;<br>    }<br>} |

Semantics of the ChunkOffsetBox is as follows, in accordance with an embodiment. The parameter version is an integer that specifies the version of this box, entry_count is an integer that gives the number of entries in the following table, mdat_identifier is a 32 bit integer that identifies the mdat box contained within this file or another file as indicated by the dref box, and chunk_offset is a 32 or 64 bit integer that gives the offset of the start of a chunk into its containing media file.

In the following, an example is provided how to indicate track run offsets relative to MediaDataBox(es), when fragmentation is used in an ISOBMFF file. First, some examples of boxes will be described.

A TrackFragmentBox may be described as follows, in accordance with an embodiment:
Box Type: 'traf'
Container: Movie Fragment Box ('moof')
Mandatory: No
Quantity: Zero or more Within the movie fragment there may be a set of track fragments, zero or more per track. The track fragments may contain zero or more track runs, which may document a contiguous run of samples for that track.

The syntax of the TrackFragmentBox may be as follows, in accordance with an embodiment:

```
aligned(8) class TrackFragmentBox extends Box('traf'){
}
```

A TrackFragmentHeaderBox may be described as follows, in accordance with an embodiment:
Box Type: 'tfhd'
Container: Track Fragment Box ('traf')
Mandatory: Yes
Quantity: Exactly one Each movie fragment may add zero or more fragments to each track; and a track fragment may add zero or more contiguous runs of samples. The track fragment header may set up information and defaults used for those runs of samples.

The syntax of the TrackFragmentHeaderBox may be as follows, in accordance with an embodiment:

```
aligned(8) class TrackFragmentHeaderBox
    extends FullBox('tfhd', 0, tf_flags){
    unsigned int(32) track_ID;
    // all the following are optional fields
    unsigned int(64) base_data_offset;
    unsigned int(32) sample_description_index;
    unsigned int(32) default_sample_duration;
    unsigned int(32) default_sample_size;
    unsigned int(32) default_sample_flags
}
```

In accordance with an embodiment, a bit in tf_flags, such as the third least significant bit (e.g. a result of the bit-wise logical operation (tf_flags & 4) being non-zero) may be used to inform the parser that the anchor for computing the offsets is based on using the mdat_identifier. For example, when tf_flags & 0x000004 is equal to 0x000004, it signals that there is no base_data_offset-present or if present, it should be ignored, and the default base offset is not the start of a moof box even if the default_base_is_moof flag is signalled.

For a TrackRunBox, a bit in tr_flags is defined which indicates that the offsets are computed using mdat_identifiers. The syntax of the TrackRunBox may then be as follows, in accordance with an embodiment:

| Syntax |
| --- |
| aligned(8) class TrackRunBox<br>    extends FullBox('trun', version, tr_flags) {<br>    unsigned int(32)    sample_count;<br>    // the following are optional fields<br>    signed int(32) data_offset;<br>    unsigned int(32)    first_sample_flags;<br>    // all fields in the following array are optional<br>    {<br>        unsigned int(32)      sample_duration;<br>        unsigned int(32)      sample_size;<br>        unsigned int(32)      sample_flags<br>        if (version == 0)<br>            { unsigned int(32)<br>            sample_composition_time_offset; }<br>        else<br>            { signed int(32)<br>            sample_composition_time_offset; }<br>    }[ sample_count ]<br>    if (tr_flags & 0x000004 = 0x000004) {<br>        unsigned int(32) mdat_identifier;<br>    }<br>} |

Semantics of the TrackRunBox is as follows, in accordance with an embodiment. The parameter sample_count indicates the number of samples being added in this run and also the number of rows in the following table (the rows can be empty), data_offset is added to the implicit or explicit data_offset established in the track fragment header, first_sample_flags provides a set of flags for the first sample only of this run, and mdat_identifier is a 32 bit integer that identifies the mdat box contained within this file or another file as indicated by the dref box.

The syntax of the TrackFragmentHeaderBox may be as follows, in accordance with an embodiment:

```
aligned(8) class TrackFragmentHeaderBox
    extends FullBox('tfhd', 0, tf_flags){
    unsigned int(32) track_ID;
    // all the following are optional fields
    unsigned int(64) base_data_offset;
    unsigned int(32) sample_description_index;
    unsigned int(32) default_sample_duration;
    unsigned int(32) default_sample_size;
    unsigned int(32) default_sample_flags;
    unsigned int(32) mdat_identifier;
}
```

In accordance with an embodiment, a bit in tf_flags, such as the third least significant bit (e.g. a result of the bit-wise logical operation (tf_flags & 4) being non-zero) may be used to indicate that the field mdat_identifier is present in TrackFragmentHeaderBox and that offsets, such as base_data_offset (if present) and data_offset in the TrackRunBox(es) contained in the TrackFragmentBox that also contains this TrackFragmentHeaderBox, are relative to the first byte of the data of the identified MediaDataBox. For example, when tf_flags & 0x000004 is equal to 0x000004, it indicates that mdat_identifier is present and that offsets are relative to the start of the data of the MediaDataBox having the identifier equal to mdat_identifier. As TrackRunBox(es) do not indicate mdat_identifier in this embodiment, all track runs of this track fragment may be required to reside in the same MediaDataBox.

In the following it will be described how item location relative to an identified MediaDataBox may be indicated, in accordance with an embodiment. In order to enable the same kind of MediaDataBox based offset calculation process in the MetaBox, a new construction method is introduced in the ItemLocationBox. This construction method has, for example, a value of 4 and its semantic is described below.

The ItemLocationBox may be described as follows, in accordance with an embodiment:
Box Type: 'iloc'
Container: Meta box ('meta')
Mandatory: No
Quantity: Zero or one The item location box may provide a directory of resources in this or other files, by locating their container, their offset within that container, and their length. The box may start with three or four values, specifying the size in bytes of the offset field, length field, base_offset field, and the extent_index fields, respectively. These values may be selected from the set {0, 4, 8}. The construction_method field may indicate the 'construction method' for the item as follows:

i) file_offset: by the usual absolute file offsets into the file at data_reference_index; (construction_method==0)
ii) idat_offset: by box offsets into the idat box in the same meta box; neither the data_reference_index nor extent_index fields are used; (construction_method==1)
iii) item_offset: by item offset into the items indicated by the extent_index field, which is only used (currently) by this construction method. (construction_method==2),
iv) mdat_offset: by box offset into a MediaDataBox, contained in the same or a referenced file (construction method==4).

The syntax of the ItemLocationBox may be as follows, in accordance with an embodiment:

```
aligned(8) class ItemLocationBox extends FullBox('iloc', version, 0) {
    unsigned int(4) offset_size;
    unsigned int(4) length_size;
    unsigned int(4) base_offset_size;
    if ((version == 1) || (version == 2)) {
        unsigned int(4) index_size;
    } else {
        unsigned int(4) reserved;
    }
    if (version < 2) {
        unsigned int(16) item_count;
    } else if (version == 2) {
        unsigned int(32) item_count;
    }
    for (i=0; i<item_count; i++) {
        if (version < 2) {
            unsigned int(16) item_ID;
        } else if (version == 2) {
            unsigned int(32) item_ID;
        }
        if ((version == 1) || (version == 2)) {
            unsigned int(12) reserved = 0;
            unsigned int(4) construction_method;
        }
        unsigned int(16) data_reference_index;
        unsigned int(base_offset_size*8) base_offset;
        unsigned int(16) extent_count;
        for (j=0; j<extent_count; j++) {
            if (((version == 1) || (version == 2)) &&
                (index_size > 0)) {
                unsigned int(index_size*8) extent_index;
            }
            unsigned int(offset_size*8) extent_offset;
            unsigned int(length_size*8) extent_length;
        }
    }
}
```

The field extent_index in the ItemLocationBox then may hold the unique mdat_identifier value of the MediaDataBox in which the item resides; the extent_offset may be used to provide the byte offset from the start of the MediaDataBox that starts the item.

In the following, an example implementation of URL fragment generation will be described, in accordance with an embodiment. In order to facilitate the addressing of boxes in the URL fragments the following additions for an URL fragment scheme of ISOBMFF may be implemented. # box_id=<4cc string> refers to a unique box identified with the 4cc (four-character code) string e.g. 'ftyp'. It is noted that another pre-defined keyword instead of the keyword box_id could equivalently be used. # box_id=<4cc string>/<id> refers to box identified with the 4cc string and having the unique identifier value of id among the boxes having the same 4cc string in the file; e.g. # box_id=moof/3 identifies a moof box with a unique identifier value as 3. It is noted that another separator instead of the slash character '/' could equivalently be used. The id value may be specified per each four-character code. For 'moof', the id value may refer to the sequence_number field of the MovieFragmentHeaderBox contained in the 'moof' box. For ProducerReferenceTimeBox ('prft'), the id value may refer to the sequence_number field of the MovieFragmentHeaderBox contained in the 'moof' box associated with the 'prft' box. For 'mdat', the id value may refer to the mdat_identifier, as specified in an embodiment above, or any other identifier for a MediaDataBox, as described in some embodiments above. For segment related boxes, such as 'styp', 'sidx', and 'ssix', the id value may be a combination of reference_ID and earliest_presentation_time fields of the associated SegmentIndexBox ('sidx'), e.g. separated with a separator character, such as the slash character.

In order to request several resources, such as several boxes, with one request, bundles of URL fragments may be specified, in according with an embodiment. For example, more than one URL fragment item can be included in the fragment part of the URL by including a specified delimiter, such as comma, between the URL fragment items. E.g. # box_id=ftyp,box_id=meta,box_id=mdat/398. In another example syntax, the keyword, such as box_id, does not need to be repeated. E.g. # box_id=ftyp,meta,mdat/398. It is noted that another separator instead of the comma character (',') could equivalently be used.

In an embodiment, a URL fragment scheme is defined to indicate all boxes of a segment (as understood in dynamic adaptive streaming context, such as MPEG-DASH) except for the MediaDataBoxes of the segment. The boxes of the segment other than MediaDataBox(es) may include for example 'styp' (the Segment Type box), SegmentIndexBox(es) ('sidx'), SubsegmentIndexBox(es) ('ssix'), MovieFragmentBox(es) ('moof'), and/or ProducerReferenceTimeBox(es) ('prft'). For example, a keyword seghdr may be used but it is noted that another pre-defined keyword instead of the keyword seghdr could equivalently be used. The URL fragment is # seghdr resolves into the segment related boxes of the segment identified by the scheme name and the hierarchical part of the URL (containing the URL fragment).

In an embodiment, a URL fragment scheme is defined to indicate all boxes of a segment that carry media data. For example, a keyword segpayload may be used but it is noted that another pre-defined keyword instead of the keyword segpayload could equivalently be used. The URL fragment is # segpayload resolves into the boxes conveying media data of the segment identified by the scheme name and the hierarchical part of the URL (containing the URL fragment).

According to an embodiment, a server resolves a URL with URL fragments that identify boxes as described above by including only those identified boxes in the resource or file that is provided as a response to the URL request. For example, # box_id=<four_character_string> resolves to a file-level box that has boxtype equal to four_character_string. It may be specified that resolving a URL fragment with indications of multiple file-level boxes results into a resource that consists of the indicated file-level boxes in the order they are listed in the URL fragment. Alternatively, it may be specified that resolving a URL fragment with indications of multiple file-level boxes results into a resource that consists of the indicated file-level boxes in any order.

In an embodiment, a player or alike obtains a MovieBox (e.g. through HTTP GET request with a URL containing fragment addressing the MovieBox). The player or alike parses the MovieBox and resolves the external data references from DataReferenceBox and the internal data references pointing to MediaDataBox(es) inside the file that also contains MovieBox. The player may obtain a file-level MetaBox, e.g. when it is known or concluded that the file contains image items. The player or alike determines which media data is needed for its purposes. For example, the player or alike may determine from the file-level MetaBox, which image item(s) are suitable for its purpose. In another example, the player or alike may determine from the MovieBox, which track(s) are suitable for its purpose. The player or alike then determines which external data references and/or MediaDataBox(es) are needed for the media data needed for its purposes. In an embodiment, a content encapsulator or alike includes in or associates with the DataReferenceBox, a URL fragment associated with the media data. In an embodiment, a player or alike parses a URL fragment associated with the media data from DataReferenceBox or an associated box, and uses the file name or URL obtained from the DataReferenceBox together with the URL fragment. In an embodiment, a player or alike fetches an external reference using a URL (as parsed from a DataReferenceBox) without a fragment part.

In the following, use of the URL fragments with image container files for selective image fetching will be described in more detail, in accordance with an embodiment.

HTML5.1 provides features for indicating different versions or alternatives of an image to enable web browsers to select an appropriate image e.g. based on its coding format and/or the width of a display window. More specifically, the picture element can enclose several versions of the same image, out of which the browser may select the version that best suits its needs, such as the resolution of the viewing area and the supported codecs. According to an embodiment, content authoring, such as HTML page authoring, is performed in a manner that image items or bundles of image items of the same container file are announced, with URL fragments, to be available for fetching. For example, the picture element of HTML5.1 (or later) may be used. An example of a part of an HTML5.1 code with a picture element different items of the same file to be available is provided in the following. In the example, the MediaDataBox ('mdat') with ID 398 contains an image for small display window widths (less than or equal to 1024 pixels), while the MediaDataBox with ID 399 contains an image for larger window widths.

```
<picture>
   <source media="(min-width <= 1024px)"
     srcset="container.heif#box_id=ftyp,box_id=meta,box_id=mdat/398">
   <source media="(min-width > 1024px)"
     srcset="container.heif#box_id=ftyp,box_id=meta,box_id=mdat/399">
   <img src="small.jpg" alt="Textual description of the image.">
</picture>
```

In an embodiment, a browser or alike selects an image from the picture element based on the description of the image, such as the media query part in the code above. The image URL may include a fragment part as described above, such as listing the boxes needed to conform to the HEIF format.

In the following, an example implementation of the information about the sequence of file-level boxes in a form of a table-of-content box will be described in more detail, in accordance with an embodiment.

To enable unique identification of the boxes at the root level of a file, each box including the box proposed below may be listed in a newly specified box with four-character code 'rbsq'. The listing of the boxes in 'rbsq' should be in the same exact order as stored in the file. When a file is edited (for example, by removal or addition of a root level box), this box should also be modified to account for the new layout of the edited file.

Description
Box Type: 'rbsq'
Container: File
Mandatory: yes for a file branded as reorderable
Quantity: only one

---

Syntax

```
aligned(8) class RootBoxSequence
   extends FullBox('rbsq', version = 0, flags = 0) {
   //Until end of box {
      unsigned int(32)      box_4cc;
      unsigned int(8) ext_flags;
      if (ext_flags & 1)
         unsigned int(32)      box_id;
   }
}
```

---

Semantics of the RootBoxSequence is as follows, in accordance with an embodiment. box_4cc is the four-character code value of a box placed at the root level of the file, ext_flags indicates which additional information is provided for the box, and box_id is a 32 bit unsigned integer that provides a unique id (within the containing file) for the box with four-character code value box_4cc.

In the following, some example embodiments are described in more detail with reference to the apparatuses of FIGS. 3a and 3b and flow diagrams of FIGS. 4a and 4b. According to an example embodiment, the apparatus 700 may receive or otherwise obtain media data 720 for generating one or more container files from the media data (block 750 in FIG. 4a). The media data may comprise one or more media data units. Each media data unit may relate to video, audio, image or other media data (e.g. text). The apparatus 700 may have a file composer 702 or other means for obtaining and/or generating a container file 722. The file composer 702 may include one or more media data units in the container file 722, or the file composer 702 may include a reference to the one or more media data units in the container file 722. The reference may, for example, comprise a URN (Uniform Resource Name) or URL (Uniform Resource Locator) that identifies a file or a resource containing the one or more media data units. Said file or resource may reside in the same or different storage system, mass memory and/or apparatus than the container file 722.

The file composer 702 of the apparatus 700 or some other means may further examine 752 whether to use offsets from the beginning of the MediaDataBox (754) or from a data origin pointer (755) and include indication 758 regarding the calculation principle of the offsets, and if the offsets are calculated relative to the MediaDataBox, offset information may also be included 756 to a file containing a ChunkOffsetBox or another entity regarding the offsets. Also TrackRunBoxes may be constructed so that they contain an identifier of the MediaDataBox, when offsets are calculated relative to the MediaDataBox.

The above mentioned data origin pointer may be, for example, the beginning of the file, the beginning of the MovieFragmentBox, the beginning of data in the Item Data box or from the beginning of a referred item data.

The container file 722 and other information may be stored into the memory 706 and/or to some other storage location, and/or the container file 722 may be transmitted to another device e.g. for storing, decomposing and playback.

In accordance with an embodiment, a file reader 710 (FIG. 3b) or player may perform the following operations to decompose the media data from the container file 722. The file reader 710 may comprise a file decomposer 712 which may check 772, 774 whether offsets regarding the received file have been calculated relative to the MediaDataBox. If so, the file decomposer 712 may read information regarding identification of the MediaDataBox and offset information to correctly calculate 777 location of media data and reconstruct 778 the media received in the file. If offsets have not been calculated relative to the MediaDataBox but to the beginning of the file, the file decomposer 712 may calculate 776 location of media data relative to the beginning of the file and reconstruct 778 the media received in the file.

When an apparatus (700, 710, or alike) accesses files or resources other than the container file e.g. using a URI or URN, and the files or resources do not reside in the same apparatus as the container file, the accessing may be performed for example using a network connection, such as a wired, wireless (e.g. WLAN) and/or mobile (e.g. GSM, 3G, and/or LTE/4G) connection.

In FIG. 5 an example illustration of some functional blocks, formats, and interfaces included in a hypertext transfer protocol (HTTP) streaming system are shown. A file encapsulator 100 takes media bitstreams of a media presentation as input. The bitstreams may already be encapsulated in one or more container files 102. The bitstreams may be received by the file encapsulator 100 while they are being created by one or more media encoders. The file encapsulator converts the media bitstreams into one or more files 104, which can be processed by a streaming server 110 such as the HTTP streaming server. The output 106 of the file encapsulator is formatted according to a server file format. The HTTP streaming server 110 may receive requests from a streaming client 120 such as the HTTP streaming client. The requests may be included in a message or messages according to e.g. the hypertext transfer protocol such as a GET request message. The request may include an address indicative of the requested media stream. The address may be the so called uniform resource locator (URL). The HTTP streaming server 110 may respond to the request by transmitting the requested media file(s) and other information such as the metadata file(s) to the HTTP streaming client 120. In some cases the HTTP streaming client 120 may then convert the media file(s) to a file format suitable for play back by the HTTP streaming client and/or by a media player 130. In other cases, the received media file(s) are suitable for playback without conversions, and the HTTP streaming client 120 may provide the media file(s) to playback (e.g. by media player 130). The media data file(s) provided for playback may also be stored into a memory 140 and/or to another kind of storage medium. The HTTP streaming client and/or the media player may include or be operationally connected to one or more media decoders, which may decode the bitstreams contained in the HTTP responses into a format that can be rendered.

HTTP Streaming Server

A HTTP streaming server 110 takes one or more files of a media presentation as input. The input files are formatted according to a server file format. The HTTP streaming server 110 responds 114 to HTTP requests 112 from a HTTP streaming client 120 by encapsulating media in HTTP responses. The HTTP streaming server outputs and transmits a file or many files of the media presentation formatted according to a transport file format and encapsulated in HTTP responses.

In accordance with an embodiment, the HTTP streaming servers 110 can be coarsely categorized into three classes. The first class is a web server, which is also known as a HTTP server, in a "static" mode. In this mode, the HTTP streaming client 120 may request one or more of the files of the presentation, which may be formatted according to the server file format, to be transmitted entirely or partly. The server is not required to prepare the content by any means. Instead, the content preparation is done in advance, possibly offline, by a separate entity. FIG. 6a illustrates an example of a web server as a HTTP streaming server. A content provider 300 may provide a content for content preparation 310 and an announcement of the content to a service/content announcement service 320. The user device 330, which may contain the HTTP streaming client 120, may receive information regarding the announcements from the service/content announcement service 320 wherein the user of the user device 330 may select a content for reception. The service/content announcement service 320 may provide a web interface and consequently the user device 330 may select a content for reception through a web browser in the user device 330. Alternatively or in addition, the service/content announcement service 320 may use other means and protocols such as the Service Advertising Protocol (SAP), the Really Simple Syndication (RSS) protocol, or an Electronic Service Guide (ESG) mechanism of a broadcast television system. The user device 330 may contain a service/content discovery element 332 to receive information relating to services/contents and e.g. provide the information to a display of the user device. The streaming client 120 may then communicate with the web server 340 to inform the web server 340 of the content the user has selected for downloading. The web server 340 may the fetch the content from the content preparation service 310 and provide the content to the HTTP streaming client 120.

The second class is a (regular) web server operationally connected with a dynamic streaming server as illustrated in FIG. 6b. The dynamic streaming server 410 dynamically tailors the streamed content to a client 420 based on requests from the client 420. The HTTP streaming server 430 interprets the HTTP GET request from the client 420 and identifies the requested media samples from a given content. The HTTP streaming server 430 then locates the requested media samples in the content file(s) or from the live stream. It then extracts and envelopes the requested media samples in a container 440. Subsequently, the newly formed container with the media samples is delivered to the client in the HTTP GET response body.

The first interface "1" in FIGS. 6a and 6b is based on the HTTP protocol and defines the syntax and semantics of the HTTP Streaming requests and responses. The HTTP Streaming requests/responses may be based on the HTTP GET requests/responses.

The second interface "2" in FIG. 6b enables access to the content delivery description. The content delivery description, which may also be called as a media presentation description, may be provided by the content provider 450 or the service provider. It gives information about the means to access the related content. In particular, it describes if the content is accessible via HTTP Streaming and how to perform the access. The content delivery description is usually retrieved via HTTP GET requests/responses but may be conveyed by other means too, such as by using SAP, RSS, or ESG.

The third interface "3" in FIG. 6b represents the Common Gateway Interface (CGI), which is a standardized and widely deployed interface between web servers and dynamic content creation servers. Other interfaces such as a representational State Transfer (REST) interface are possible and would enable the construction of more cache-friendly resource locators.

The Common Gateway Interface (CGI) defines how web server software can delegate the generation of web pages to a console application. Such applications are known as CGI scripts; they can be written in any programming language, although scripting languages are often used. One task of a web server is to respond to requests for web pages issued by clients (usually web browsers) by analyzing the content of the request, determining an appropriate document to send in response, and providing the document to the client. If the request identifies a file on disk, the server can return the contents of the file. Alternatively, the content of the document can be composed on the fly. One way of doing this is to let a console application compute the document's contents, and inform the web server to use that console application. CGI specifies which information is communicated between the web server and such a console application, and how.

The representational State Transfer is a style of software architecture for distributed hypermedia systems such as the World Wide Web (WWW). REST-style architectures consist of clients and servers. Clients initiate requests to servers; servers process requests and return appropriate responses. Requests and responses are built around the transfer of "representations" of "resources". A resource can be essentially any coherent and meaningful concept that may be addressed. A representation of a resource may be a document that captures the current or intended state of a resource. At any particular time, a client can either be transitioning between application states or at rest. A client in a rest state is able to interact with its user, but creates no load and consumes no per-client storage on the set of servers or on the network. The client may begin to send requests when it is ready to transition to a new state. While one or more requests are outstanding, the client is considered to be transitioning states. The representation of each application state contains links that may be used next time the client chooses to initiate a new state transition.

The third class of the HTTP streaming servers according to this example classification is a dynamic HTTP streaming server. Otherwise similar to the second class, but the HTTP server and the dynamic streaming server form a single component. In addition, a dynamic HTTP streaming server may be state-keeping.

Server-end solutions can realize HTTP streaming in two modes of operation: static HTTP streaming and dynamic HTTP streaming. In the static HTTP streaming case, the content is prepared in advance or independent of the server. The structure of the media data is not modified by the server to suit the clients' needs. A regular web server in "static" mode can only operate in static HTTP streaming mode. In the dynamic HTTP streaming case, the content preparation is done dynamically at the server upon receiving a non-cached request. A regular web server operationally connected with a dynamic streaming server and a dynamic HTTP streaming server can be operated in the dynamic HTTP streaming mode.

Transport File Format

In an example embodiment transport file formats can be coarsely categorized into two classes. In the first class transmitted files are compliant with an existing file format that can be used for file playback. For example, transmitted files are compliant with the ISO Base Media File Format or the progressive download profile of the 3GPP file format.

In the second class transmitted files are similar to files formatted according to an existing file format used for file playback. For example, transmitted files may be fragments of a server file, which might not be self-containing for playback individually. In another approach, files to be transmitted are compliant with an existing file format that can be used for file playback, but the files are transmitted only partially and hence playback of such files requires awareness and capability of managing partial files.

Transmitted files can usually be converted to comply with an existing file format used for file playback.

HTTP Cache

An HTTP cache 150 (FIG. 5) may be a regular web cache that stores HTTP requests and responses to the requests to reduce bandwidth usage, server load, and perceived lag. If an HTTP cache contains a particular HTTP request and its response, it may serve the requestor instead of the HTTP streaming server.

HTTP Streaming Client

An HTTP streaming client 120 receives the file(s) of the media presentation. The HTTP streaming client 120 may contain or may be operationally connected to a media player 130 which parses the files, decodes the included media streams and renders the decoded media streams. The media player 130 may also store the received file(s) for further use. An interchange file format can be used for storage.

In some example embodiments the HTTP streaming clients can be coarsely categorized into at least the following two classes. In the first class conventional progressive downloading clients guess or conclude a suitable buffering time for the digital media files being received and start the media rendering after this buffering time. Conventional progressive downloading clients do not create requests related to bitrate adaptation of the media presentation.

In the second class active HTTP streaming clients monitor the buffering status of the presentation in the HTTP streaming client and may create requests related to bitrate adaptation in order to guarantee rendering of the presentation without interruptions.

The HTTP streaming client 120 may convert the received HTTP response payloads formatted according to the transport file format to one or more files formatted according to an interchange file format. The conversion may happen as the HTTP responses are received, i.e. an HTTP response is written to a media file as soon as it has been received. Alternatively, the conversion may happen when multiple HTTP responses up to all HTTP responses for a streaming session have been received. The conversion may for example comprise placing an initialization segment at the beginning of the interchange file followed by a sequential concatenation of the received HTTP response payloads.

Interchange File Formats

In some example embodiments the interchange file formats can be coarsely categorized into at least the following two classes. In the first class the received files are stored as such according to the transport file format.

In the second class the received files are stored according to an existing file format used for file playback.

A Media File Player

A media file player 130 may parse, verify, decode, and render stored files. A media file player 130 may be capable of parsing, verifying, decoding, and rendering either or both classes of interchange files. A media file player 130 is referred to as a legacy player if it can parse and play files stored according to an existing file format but might not play files stored according to the transport file format. A media file player 130 is referred to as an HTTP streaming aware player if it can parse and play files stored according to the transport file format.

In some implementations, an HTTP streaming client merely receives and stores one or more files but does not play them. In contrast, a media file player parses, verifies, decodes, and renders these files while they are being received and stored.

In some implementations, the HTTP streaming client 120 and the media file player 130 are or reside in different devices. In some implementations, the HTTP streaming client 120 transmits a media file formatted according to a interchange file format over a network connection, such as a wireless local area network (WLAN) connection, to the media file player 130, which plays the media file. The media file may be transmitted while it is being created in the process of converting the received HTTP responses to the media file. Alternatively, the media file may be transmitted after it has been completed in the process of converting the received HTTP responses to the media file. The media file player 130 may decode and play the media file while it is being received. For example, the media file player 130 may download the media file progressively using an HTTP GET request from the HTTP streaming client. Alternatively, the media file player 130 may decode and play the media file after it has been completely received.

HTTP pipelining is a technique in which multiple HTTP requests are written out to a single socket without waiting for the corresponding responses. Since it may be possible to fit several HTTP requests in the same transmission packet such as a transmission control protocol (TCP) packet, HTTP pipelining allows fewer transmission packets to be sent over the network, which may reduce the network load.

A connection may be identified by a quadruplet of server IP address, server port number, client IP address, and client port number. Multiple simultaneous TCP connections from the same client to the same server are possible since each client process is assigned a different port number. Thus, even if all TCP connections access the same server process (such as the web server process at port 80 dedicated for HTTP), they all have a different client socket and represent unique connections. This is what enables several simultaneous requests to the same web site from the same computer.

Categorization of Multimedia Formats

The multimedia container file format is an element used in the chain of multimedia content production, manipulation, transmission and consumption. There may be substantial differences between a coding format (also known as an elementary stream format) and a container file format. The coding format relates to the action of a specific coding algorithm that codes the content information into a bitstream. The container file format comprises means of organizing the generated bitstream in such way that it can be accessed for local decoding and playback, transferred as a file, or streamed, all utilizing a variety of storage and transport architectures. Furthermore, the file format can facilitate interchange and editing of the media as well as recording of received real-time streams to a file.

FIG. 7 is a graphical representation of an example of a generic multimedia communication system within which various embodiments may be implemented. As shown in FIG. 7, a data source 1500 provides a source signal in an analog, uncompressed digital, or compressed digital format, or any combination of these formats. An encoder 1510 encodes the source signal into a coded media bitstream. It should be noted that a bitstream to be decoded can be received directly or indirectly from a remote device located within virtually any type of network. Additionally, the bitstream can be received from local hardware or software. The encoder 1510 may be capable of encoding more than one media type, such as audio and video, or more than one encoder 1510 may be required to code different media types of the source signal. The encoder 1510 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 7 only one encoder 1510 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 1520. The storage 1520 may comprise any type of mass memory to store the coded media bitstream. The format of the coded media bitstream in the storage 1520 may be an elementary self-contained bitstream format, or one or more coded media bitstreams may be encapsulated into a container file. Some systems operate "live", i.e. omit storage and transfer coded media bitstream from the encoder 1510 directly to the sender 1530. The coded media bitstream is then transferred to the sender 1530, also referred to as the server, on a need basis. The format used in the transmission may be an elementary self-contained bitstream format, a packet stream format, or one or more coded media bitstreams may be encapsulated into a container file. The encoder 1510, the storage 1520, and the sender 1530 may reside in the same physical device or they may be included in separate devices. The encoder 1510 and sender 1530 may operate with live real-time content, in which case the coded media bitstream is typically not stored permanently, but rather buffered for small periods of time in the content encoder 1510 and/or in the sender 1530 to smooth out variations in processing delay, transfer delay, and coded media bitrate.

The sender 1530 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 1530 encapsulates the coded media bitstream into packets. For example, when RTP is used, the sender 1530 encapsulates the coded media bitstream into RTP packets according to an RTP payload format. Typically, each media type has a dedicated RTP payload format. It should be again noted that a system may contain more than one sender 1530, but for the sake of simplicity, the following description only considers one sender 1530.

If the media content is encapsulated in a container file for the storage 1520 or for inputting the data to the sender 1530, the sender 1530 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The sender 1530 may or may not be connected to a gateway 1540 through a communication network. The gateway 1540 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 1540 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 1540 is called an RTP mixer or an RTP translator and typically acts as an endpoint of an RTP connection.

The system includes one or more receivers 1550, typically capable of receiving, de-modulating, and de-capsulating the transmitted signal into a coded media bitstream. The coded media bitstream is transferred to a recording storage 1555. The recording storage 1555 may comprise any type of mass memory to store the coded media bitstream. The recording storage 1555 may alternatively or additionally comprise computation memory, such as random access memory. The format of the coded media bitstream in the recording storage 1555 may be an elementary self-contained bitstream format, or one or more coded media bitstreams may be encapsulated into a container file. If there are multiple coded media bitstreams, such as an audio stream and a video stream, associated with each other, a container file is typically used and the receiver 1550 comprises or is attached to a container file generator producing a container file from input streams. Some systems operate "live," i.e. omit the recording storage 1555 and transfer coded media bitstream from the receiver 1550 directly to the decoder 1560. In some systems, only the most recent part of the recorded stream, e.g., the most recent 10-minute excerption of the recorded stream, is maintained in the recording storage 1555, while any earlier recorded data is discarded from the recording storage 1555.

The coded media bitstream is transferred from the recording storage 1555 to the decoder 1560. If there are many coded media bitstreams, such as an audio stream and a video stream, associated with each other and encapsulated into a container file, a file parser (not shown in the figure) is used to decapsulate each coded media bitstream from the container file. The recording storage 1555 or a decoder 1560 may comprise the file parser, or the file parser is attached to either recording storage 1555 or the decoder 1560.

The coded media bitstream may be processed further by a decoder 1560, whose output is one or more uncompressed media streams. Finally, a renderer 1570 may reproduce the uncompressed media streams with a loudspeaker or a display, for example. The receiver 1550, recording storage 1555, decoder 1560, and renderer 1570 may reside in the same physical device or they may be included in separate devices.

FIG. 8 shows a block diagram of a video coding system according to an example embodiment as a schematic block diagram of an exemplary apparatus or electronic device 50, which may incorporate a codec according to an embodiment of the invention. FIG. 9 shows a layout of an apparatus according to an example embodiment. The elements of FIGS. 8 and 9 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. In accordance with an embodiment, the apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In accordance with an embodiment, the apparatus 50 comprises a camera capable of recording or detecting individual frames which are then passed to the codec 54 or controller for processing. In accordance with an embodiment, the apparatus may receive the video image data for processing from another device prior to transmission and/or storage. In accordance with an embodiment, the apparatus 50 may receive either wirelessly or by a wired connection the image for coding/decoding.

FIG. 10 shows an arrangement for video coding comprising a plurality of apparatuses, networks and network elements according to an example embodiment. With respect to FIG. 10, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention. For example, the system shown in FIG. 10 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In the above, some embodiments have been described with reference to structures and concepts of the ISOBMFF. It needs to be understood that embodiments can similarly be realized with other container file formats, such as Matroska or its derivatives. Embodiments can be similarly realized with reference to similar data structures than those of ISOBMFF, such as boxes.

In the above, some embodiments have been described with reference to the phrase offset(s) relative to a particular MediaDataBox or similar phrases. Some embodiments, on the other hand, have been described more explicitly to deriving the location pointed to by offset(s) by adding the offset(s) to the beginning of media payload data within the MediaDataBox. What is more, some embodiments have been described where offset(s) are relative to the start of the MediaDataBox. It needs to be understood that embodiments can be similarly realized when the reference point for the offset(s) is the beginning of the MediaDataBox (the first byte of the box header of the MediaDataBox), the beginning of the box data of the MediaDataBox (which may point to the identifier of the MediaDataBox in some embodiments), or the beginning of media data within the MediaDataBox (the byte immediately after the identifier of the MediaDataBox in some embodiments), or any pre-defined or indicated location that is relative to the location of the MediaDataBox.

In the above, some embodiments have been described with reference to MediaDataBox(es), as defined in ISOBMFF. It needs to be understood that some embodiments can be similarly realized with other box types. For example, embodiments for or based on an identifier of a MediaDataBox could be similarly realized for other box types. It also needs to be understood that embodiments can be similarly realized with other container structures for media data. For example, a new box type, with a different four-character code than that of MediaDataBox, may be specified for containing an mdat_identifier or alike, followed by media data.

In the above, some embodiments have been described in relation to HTTP and HTTP/1.1. It needs to be understood that embodiments are not limited to the use of HTTP, but other protocols, such as WebSockets, or other versions of HTTP, e.g. HTTP/2, may be used instead or additionally.

In the above, some embodiments have been described with reference to formats and concepts of DASH. It needs to be understood that embodiments can similarly be realized with other streaming and transport systems and mechanisms, such as HTTP Live Streaming (as defined in the IETF Internet Draft draft-pantos-http-live-streaming) or MPEG Media Transport (MMT, specified as part of ISO/IEC 23008).

In the above, some embodiments have been described with reference to a file. It needs to be understood that embodiments can likewise be described with reference to a file segment, such as a segment or subsegment as defined in DASH, or a resource, e.g. as understood to be received as response to an HTTP GET request.

In the above, some embodiments have been described with reference to features of HTML 5.1, e.g. when it comes to announcing the availability of multiple alternative images stored within the same container file through a URL fragment scheme. It needs to be understood that embodiments can be similarly realized with other schemes whereby a URL fragment scheme or alike is in use. For example, embodiments can be used with Synchronized Media Integration Language (SMIL).

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIGS. 8 and 9. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys Inc., of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

There is provided a method comprising:
receiving a container file including at least one meta data unit in a media data structure;
receiving offset data;
determining that the offset data is relative to a location of the media data structure in the container file; and
if the examination reveals that the offset data is relative to the location of the media data structure, using the offset data as a reference to the location of the media data structure to obtain the media data unit.

In an embodiment, the method further comprises:
receiving an identifier of the media data structure, the identifier being associated with the offset data; and
selecting the media data structure from the container file on the basis of the identifier.

In an embodiment, the method further comprises:
receiving a second identifier within the media data structure; and
selecting the media data structure from the container file on the basis of the identifier being equal to the second identifier.

In an embodiment, the method further comprises:
associating the offset data with a data reference index to a list of data references included in the container file;
using the data reference index to select a data reference from the list of data references, the selected data reference comprising the identifier of the media data structure.

In an embodiment, the method further comprises:
receiving the identifier in a data structure containing the offset data.

In an embodiment of the method the at least one media data unit is a sample of a track, the track comprising a sequence of samples in decoding order.

In an embodiment of the method the at least one media data unit is an item that is not associated with a decoding order.

In an embodiment of the method the offset data is relative to a beginning of the media data structure, wherein the method further comprises:

using the offset data and a location of the beginning of the media data structure to obtain the media data unit.

In an embodiment of the method the container file comprises two or more subsets of the media data, wherein the method further comprises:

requesting from a server a subset of the media data among the two or more subsets.

In an embodiment, the method further comprises:

receiving a first media file format box containing offsets, the first media file format box being associated with a second media file format box containing the addressed data;

receiving the second media file format box; and using offset data from the first media file format box to obtain the media data unit from the second media file format box.

In a second example, there is provided an apparatus comprising at least one processor and at least one memory, said at least one memory stored with code thereon, which when executed by said at least one processor, causes an apparatus to perform at least the following:

receive a container file including at least one meta data unit in a media data structure;

receive offset data;

determine that the offset data is relative to a location of the media data structure in the container file; and if the examination reveals that the offset data is relative to the location of the media data structure, use the offset data as a reference to the location of the media data structure to obtain the media data unit.

In an embodiment of the apparatus, said at least one memory stored with code thereon, which when executed by said at least one processor, causes an apparatus to perform at least the following:

receive an identifier of the media data structure, the identifier being associated with the offset data; and select the media data structure from the container file on the basis of the identifier.

In an embodiment of the apparatus, said at least one memory stored with code thereon, which when executed by said at least one processor, causes an apparatus to perform at least the following:

receive a second identifier within the media data structure; and select the media data structure from the container file on the basis of the identifier being equal to the second identifier.

In an embodiment of the apparatus, said at least one memory stored with code thereon, which when executed by said at least one processor, causes an apparatus to perform at least the following:

associate the offset data with a data reference index to a list of data references included in the container file;

use the data reference index to select a data reference from the list of data references, the selected data reference comprising an identifier of the media data structure.

In an embodiment of the apparatus, said at least one memory stored with code thereon, which when executed by said at least one processor, causes an apparatus to perform at least the following:

receive the identifier in a data structure containing the offset data.

In an embodiment of the apparatus, wherein the offset data is relative to a beginning of the media data structure, said at least one memory stored with code thereon, which when executed by said at least one processor, causes an apparatus to perform at least the following:

use the offset data and a location of the beginning of the media data structure to obtain the media data unit.

In an embodiment of the apparatus, said at least one memory stored with code thereon, which when executed by said at least one processor, causes an apparatus to perform at least the following:

receive a first media file format box containing offsets, the first media file format box being associated with a second media file format box containing the addressed data;

receive the second media file format box; and use offset data from the first media file format box to obtain the media data unit from the second media file format box.

In a third example, there is provided a computer program product embodied on a non-transitory computer readable medium, comprising computer program code configured to, when executed on at least one processor, cause an apparatus or a system to:

receive a container file including at least one meta data unit in a media data structure;

receive offset data;

determine that the offset data is relative to a location of the media data structure in the container file; and if the examination reveals that the offset data is relative to the location of the media data structure, use the offset data as a reference to the location of the media data structure to obtain the media data unit.

In a fourth example, there is provided a method comprising:

forming a container file including at least one meta data unit in a media data structure;

forming offset data into the container file as a reference to the location of the media data unit relative to the media data structure; and including an indication that the offset data is relative to the location of the media data structure.

In an embodiment, the method further comprises:

including, in the container file, a first identifier of the media data structure, the first identifier associated with the offset data.

In an embodiment, the method further comprises:

including, in the container file, a second identifier of the media data structure within the media data structure, the second identifier being equal to the first identifier.

In an embodiment, the method further comprises:

including, in the container file, a list of data references;

including, within the list of data reference, a data reference comprising the first identifier;

associating, in the container file, the offset data with a data reference index to the list of data references, the data reference index referring to the data reference comprising the first identifier;

using the data reference index to select a data reference from the list of data references, the selected data reference comprising an identifier of the media data structure.

In an embodiment, the method further comprises:

including the first identifier in a data structure containing the offset data.

In a fifth example, there is provided an apparatus comprising at least one processor and at least one memory, said at least one memory stored with code thereon, which when executed by said at least one processor, causes an apparatus to perform at least the following:

form a container file including at least one meta data unit in a media data structure;

form offset data into the container file as a reference to the location of the media data unit relative to the media data structure; and include an indication that the offset data is relative to the location of the media data structure.

In an embodiment of the apparatus, said at least one memory stored with code thereon, which when executed by said at least one processor, causes an apparatus to perform at least the following:

include in the container file a first identifier of the media data structure, the first identifier associated with the offset data.

In an embodiment of the apparatus, said at least one memory stored with code thereon, which when executed by said at least one processor, causes an apparatus to perform at least the following:

include in the container file a second identifier of the media data structure within the media data structure, the second identifier being equal to the first identifier.

In a sixth example, there is provided a computer program product embodied on a non-transitory computer readable medium, comprising computer program code configured to, when executed on at least one processor, cause an apparatus or a system to:

form a container file including at least one meta data unit in a media data structure;

form offset data into the container file as a reference to the location of the media data unit relative to the media data structure; and include an indication that the offset data is relative to the location of the media data structure.

In a seventh example, there is provided an apparatus configured to perform the method of the first example.

In an eighth example, there is provided an apparatus configured to perform the method of the fourth example.

In a ninth example, there is provided an apparatus comprising:

means for receiving a container file including at least one meta data unit in a media data structure;

means for receiving offset data;

means for determining that the offset data is relative to a location of the media data structure in the container file; and means for using the offset data as a reference to the location of the media data structure to obtain the media data unit, if the examination reveals that the offset data is relative to the location of the media data structure.

In a tenth example, there is provided an apparatus comprising:

means for forming a container file including at least one meta data unit in a media data structure;

means for forming offset data into the container file as a reference to the location of the media data unit relative to the media data structure; and means for including an indication that the offset data is relative to the location of the media data structure.

In an eleventh example, there is provided a method comprising:

requesting a part of a file with a first request, the first request comprising an identification of a data structure, the identification comprising a type and an identifier, wherein the identifier identifies the data structure among several data structures of the same type.

In a twelfth example, there is provided a method comprising:

receiving a first request that requests a part of a file, the first request comprising an identification of a data structure, the identification comprising a type and an identifier, wherein the identifier identifies the data structure among several data structures of the same type;

concluding the part of the file, said concluding comprising identification of the data structure based on the type and the identifier;

responding to the first request by transmitting the part of the file.

In an embodiment, the method further comprises:

transmitting the part of the file progressively in more than one chunk.

In a thirteenth example, there is provided an apparatus configured to perform the method of the eleventh example.

In a fourteenth example, there is provided an apparatus configured to perform the method of the twelfth example.

The invention claimed is:

1. An apparatus comprising at least one processor and at least one memory, said at least one memory stored with code thereon, which when executed by said at least one processor, causes an apparatus to perform at least the following:

receive a container file including at least one media data unit in a media data box;

receive an offset data;

receive an identifier of the media data box, the identifier being associated with the offset data;

determine that when the offset data is calculated relative to a location of the media data box in the container file, then calculate a location of the at least one media data unit using the offset data and the identifier of the media data box;

determine that when the offset data is not calculated relative to the location of the media data box but to the beginning of the container file, then calculate a location of the at least one media data unit relative to the beginning of the container file; and obtain the at least one media data unit based on the calculated location.

2. The apparatus according to claim 1, said at least one memory stored with code thereon, which when executed by said at least one processor, causes an apparatus to perform at least the following:

select the media data box from the container file on the basis of the identifier.

3. The apparatus according to claim 2, said at least one memory stored with code thereon, which when executed by said at least one processor, causes an apparatus to perform at least the following:

receive a second identifier within the media data box; and select the media data box from the container file on the basis of the identifier being equal to the second identifier.

4. The apparatus according to claim 2, said at least one memory stored with code thereon, which when executed by said at least one processor, causes an apparatus to perform at least the following:

associate the offset data with a data reference index to a list of data references included in the container file;

use the data reference index to select a data reference from the list of data references, the selected data reference comprising an identifier of the media data box.

5. The apparatus according to claim 2, said at least one memory stored with code thereon, which when executed by said at least one processor, causes an apparatus to perform at least the following:

receive the identifier in a data structure containing the offset data.

6. The apparatus according to claim 2, wherein the at least one media data unit is an item that is not associated with a decoding order.

7. The apparatus according to claim 1, wherein the at least one media data unit is a sample of a track, the track comprising a sequence of samples in decoding order.

8. The apparatus according to claim 1, wherein the offset data is relative to a beginning of the media data box, said at least one memory stored with code thereon, which when executed by said at least one processor, causes an apparatus to perform at least the following:
   use the offset data and a location of the beginning of the media data box to obtain the media data unit.

9. The apparatus according to claim 1, said at least one memory stored with code thereon, which when executed by said at least one processor, causes an apparatus to perform at least the following:
   receive a first media file format box containing offsets, the first media file format box being associated with a second media file format box containing the addressed data;
   receive the second media file format box; and
   use offset data from the first media file format box to obtain the media data unit from the second media file format box.

10. A method comprising:
   receiving a container file including at least one media data unit in a media data box;
   receiving an offset data;
   receive an identifier of the media data box, the identifier being associated with the offset data;
   determining that the offset data is calculated relative to a location of the media data box in the container file, then calculate a location of the at least one media data unit using the offset data and the identifier of the media data box;
   determining that the offset data is not calculated relative to the location of the media data box but to the beginning of the container file, then calculate a location of the at least one media data unit relative to the beginning of the container file; and
   obtaining the at least one media data unit based on the calculated location.

11. The method according to claim 10 further comprising:
   selecting the media data box from the container file on the basis of the identifier.

* * * * *